United States Patent
Amano

(10) Patent No.: US 8,045,846 B2
(45) Date of Patent: Oct. 25, 2011

(54) COMPOSITION FOR HEAT-STORAGE OBJECT FORMATION, HEAT-STORAGE OBJECT, AND PROCESS FOR PRODUCING HEAT-STORAGE OBJECT

(75) Inventor: Ryotaro Amano, Ibaraki (JP)

(73) Assignee: SK Kaken Co., Ltd., Osaka (JP)

( * ) Notice: Subject to any disclaimer, the term of this patent is extended or adjusted under 35 U.S.C. 154(b) by 1045 days.

(21) Appl. No.: 11/814,657

(22) PCT Filed: Jan. 25, 2006

(86) PCT No.: PCT/JP2006/301137
§ 371 (c)(1),
(2), (4) Date: Jul. 24, 2007

(87) PCT Pub. No.: WO2006/080346
PCT Pub. Date: Aug. 3, 2006

(65) Prior Publication Data
US 2009/0199994 A1    Aug. 13, 2009

(30) Foreign Application Priority Data

Jan. 27, 2005  (JP) ............................... 2005-020117
Mar. 31, 2005  (JP) ............................... 2005-104592
Nov. 7, 2005  (JP) ............................... 2005-322930

(51) Int. Cl.
*F24H 7/00*        (2006.01)
(52) U.S. Cl. ........................................ 392/346; 392/339
(58) Field of Classification Search .................. 392/339, 392/346
See application file for complete search history.

(56) References Cited

U.S. PATENT DOCUMENTS
4,237,023 A  *  12/1980  Johnson et al. ................. 252/70
(Continued)

FOREIGN PATENT DOCUMENTS
JP            61-122354 A     6/1986
(Continued)

OTHER PUBLICATIONS

T. Kondo et al., "Research on the Thermal Storage of PCM (Phase Change Material) Wallboard", J. Archit. Plann. Environ. Eng., AIJ. No. 540, Feb. 2001, pp. 23-29, English translation.

Primary Examiner — Thor S Campbell
(74) Attorney, Agent, or Firm — Sughrue Mion, PLLC

(57) ABSTRACT

A heat-storage object which can be formed in a desired shape, has a high heat-storage material content and hence excellent heat-storage property, undergoes no leakage with time despite the high heat-storage material content, and even when subjected to processing such as cutting or punching, does not undergoes leakage through the cut surface or hole, and has excellent processability, as well as a composition for heat-storage object formation, and a process for producing the same. The heat-storage object comprises fine particles of an organic latent heat-storage material (a), the particles having been fixed with a binder (c). It is produced by mixing a composition for heat-storage object formation containing an organic latent heat-storage material (a), a nonionic surfactant (b) and a compound (c-1) having reactive functional group, with a compound (c-2) having a second reactive functional group reactive with the reactive functional group, dispersing the organic latent heat-storage material (a) in a colloidal state, reacting the component (c-1) with the component (c-2) to form a binder (c), and fixing the organic latent heat-storage material (a) in the form of fine particles with the binder (c).

24 Claims, 5 Drawing Sheets

U.S. PATENT DOCUMENTS

| | | | |
|---|---|---|---|
| 4,349,446 A * | 9/1982 | Marks | 252/70 |
| 5,525,251 A * | 6/1996 | Hammond | 252/70 |
| 5,565,132 A | 10/1996 | Salyer | |
| 5,718,835 A * | 2/1998 | Momose et al. | 252/73 |
| 5,882,542 A * | 3/1999 | Saita et al. | 252/70 |
| 5,954,984 A * | 9/1999 | Ablah et al. | 219/621 |
| 6,830,791 B1 | 12/2004 | Misonou | |

FOREIGN PATENT DOCUMENTS

| | | |
|---|---|---|
| JP | 62-148587 A | 7/1987 |
| JP | 63-103454 U | 7/1988 |
| JP | 4-72383 A | 3/1992 |
| JP | 4-85387 A | 3/1992 |
| JP | 2548850 B2 | 8/1996 |
| JP | 9-143461 A | 6/1997 |
| JP | 9-143462 A | 6/1997 |
| JP | 10-9782 A | 1/1998 |
| JP | 10-311693 A | 11/1998 |
| JP | 11-80723 A | 3/1999 |
| JP | 11-152465 A | 6/1999 |
| JP | 11-323321 A | 11/1999 |
| JP | 11-348169 A | 12/1999 |
| JP | 2000-87656 A | 3/2000 |
| JP | 2001-304596 A | 10/2001 |
| JP | 2003-34993 A | 2/2003 |
| JP | 2004-168792 A | 6/2004 |
| JP | 2005-246963 A | 9/2005 |
| JP | 2005-272830 A | 10/2005 |
| JP | 2005-289043 A | 10/2005 |

* cited by examiner

COMPOSITION FOR HEAT-STORAGE OBJECT FORMATION, HEAT-STORAGE OBJECT, AND PROCESS FOR PRODUCING HEAT-STORAGE OBJECT

TECHNICAL FIELD

The present invention relates to a composition for heat-storage object formation having high heat-storage property, a heat-storage object, and a process for producing a heat-storage object.

BACKGROUND ART (1) In recent years, technologies of storing heat energy, that is, heat-storage technologies attract attention as those solving present-day energy problems. The heat-storage technologies are technologies of effectively utilizing natural energy such as solar heat, geothermal heat etc. and remaining heat from cooling/heating equipments, and are utilized for example as technologies in which inexpensive nighttime power is utilized in a house to store heat and utilized as a multi-purpose heat source to reduce consumption in daytime electric power.

Heat-storage materials used in such heat-storage technologies include sensible heat-storage materials and latent heat-storage materials, and particularly the latent heat-storage materials utilizing latent heat resulting from the phase change of a substance are often used.

These latent heat-storage materials store heat (heat storage) upon phase change of a substance from solid to liquid and release heat (heat release) upon phase change from liquid to solid, and by utilizing this property, heat is stored and released. Generally, many latent heat-storage materials undergo phase change (solid/liquid change) in the temperature range of 15 to 50° C. Accordingly, the latent heat-storage material should be handled as liquid and used generally by encapsulating it in a liquid state in a laminate sheet or plastic case capable of being closed.

Although the size of such laminate sheet and plastic case is limited to a predetermined dimension, processing such as cutting is not feasible due to leakage of the latent heat-storage material. Application by nailing is not feasible due to leakage of the latent heat-storage material. When the laminate sheet or plastic case is fixed perpendicularly, the heat-storage material is distributed in higher density at the bottom, so there is a problem that the heat-storage material cannot be effectively utilized.

Therefore, the heat-storage material is exclusively horizontally disposed for use as typified by the heat-storage material used for floor heating in a heat-storage system under the present circumstances.

Against such problem, Patent Literature 1 proposes a heat-storage object comprising latent heat-storage capsules supported on a coating film or a sheet, thereby enabling processing such as cutting or application by nailing and preventing the heat-storage material from being distributed in higher density at the bottom, while in Non-Patent Literature 1, the above problem is solved by mixing a encapsulated latent heat-storage material with a material such as plasterboard and then fixing it via an inorganic binder or resin. In Patent Literature 2, on the other hand, a heat-storage material is supported on a porous material in order to solve the above problem and achieve sufficient heat-storage property.

(2) Glass, resin boards, metal plates etc. are used in various fields and become essential in our living spaces, for example in plate glasses, floors, walls and ceilings in housings, offices and greenhouses. In housings and offices, for example, plate glasses, walls and the like separate the room from the outside world, and in summer and during daylight, warm air of the outside world is shut out and the living space is made comfortable by a cooler etc. In winter and at night, cold air of the outside world is shut out and the living space is made comfortable by a heater etc. In a greenhouse etc., glass or the like separates the house from the outside world, and the temperature in the house can be controlled as desired.

However, when a material of high heat conductivity, such as glass, is used in housings, offices, greenhouses etc., cool air in the room is easily warmed by warm air of the outside world in summer or during daylight. In winter and at night, on the other hand, warm air in the room is easily cooled by cold air of the outside world, and consequently, excessive heating or cooling energy should be used.

In Patent Literature 3, insulation in the room is improved by laminating a heat insulating sheet on glass in order to solve the problem. In Patent Literature 4, insulating property in the room is improved by arranging an air layer, a vacuum layer and a low-emissivity layer between glasses.

(3) As technologies of controlling heat energy, there are heat insulation technologies in addition to the heat-storage technologies, and as materials utilizing such heat-storage technologies and heat insulation technologies, for example in the field of housing, there are known materials used in energy-saving housings wherein inexpensive nighttime power is utilized to store heat and utilized as a general-purpose heat source, thereby reducing daytime power consumption, while the influence of outside air temperature is shut out to reduce a fluctuation in room temperature.

For example, Patent Literature 5 describes a building frame panel provided with a heat insulator in the exterior side and with a latent heat-storage material in the interior side, thereby attempting at energy saving for heating and cooling energy in a housing. In Patent Literature 5, a latent heat-storage material hermetically sealed in a casing is laminated with a heat insulator. Patent Literature 6 describes a frame structure wherein a heat insulator in the exterior side is used in combination with a heat-storage object consisting of a latent heat-storage material in the interior side, which reduces a fluctuation in room temperature against outside air temperature and maintains a comfortable indoor condition, thereby attempting at saving energy required for cooling and heating. In Patent Literature 6, a microencapsulated latent heat-storage material is used as the heat-storage object.

(4) With rising concern of housing environment in recent years, there are rapidly increasing housings provided with a floor heating system where a heat source such as a heating wire and a hot-water pipe is provided in a floor. In the floor heating system, heat generated by a heat source such as a heating wire and a hot-water pipe is used to warm the interior space, and particularly when a heating wire is used, considerable power consumption is necessary for heating the floor.

As one solution of such problem, there is a heat-storage-type floor heating system having a heat-storage material introduced into a floor heating system. A majority of latent heat-storage materials used in the heat-storage-type floor heating system are those for storing heat (heat storage) upon phase change thereof from solid to liquid and for releasing heat (heat release) upon phase change from liquid to solid, and many of them undergo phase change (solid/liquid change) generally in the temperature range of 15 to 50° C.

When such latent heat-storage materials are used in a floor heating system, for example, it is possible to use inexpensive nighttime power, to storage heat, and release the heat gradually in the daytime thereby reducing power consumption. Once the latent heat-storage materials are warmed, they can keep the temperature constant for a long time, thus enabling reduction in power consumption and maintenance of a comfortable living environment.

As the floor heating system utilizing latent heat-storage materials, for example, Patent Literature 7 describes use of cased latent heat-storage materials.

(5) Patent Literature 8 discloses a heat-storage object capable of high-frequency heating, which comprises a crystal water-containing hydrate contained in a molten mixture of an ethylene/olefin copolymer and a crystalline organic compound (paraffin).

Patent Literature 1: JP-A 10-311693 (claims)
Non-Patent Literature 1: Design-Series Collected Papers, Architectural Institute of Japan, No. 540, 23-29, February, 2001
Patent Literature 2: JP-A 9-143461
Patent Literature 3: JP-A 11-348169
Patent Literature 4: JP-A 2000-87656
Patent Literature 5: JP-A 61-122354
Patent Literature 6: JP-A 2003-34993
Patent Literature 7: JP-A 2001-304596
Patent Literature 8: Japanese Patent No. 2548850

DISCLOSURE OF THE INVENTION

Problems to be Solved by the Invention

In Patent Literature 1 and Non-Patent Literature 1, efficient transfer of heat to the heat-storage material itself is easily suppressed, and the heat-storage material content is decreased, and thus there is a problem that sufficient heat-storage property is hardly obtained. In the invention in Patent Literature 2, a heat-storage material is merely supported on a porous material, and depending on the case, the heat-storage material may leak out.

First object of the present invention is to provide a composition for heat-storage object formation, capable of producing a heat-storage object which can be formed in a desired shape, has a high heat-storage material content and hence excellent heat-storage property, and undergoes no leakage with time despite the high heat-storage material content, and even when subjected to processing such as cutting or punching, does not undergo leakage through the cut surface or hole, and has excellent processability. Another object of the present invention is to provide a composition for heat-storage object formation, capable of producing a heat-storage structure comprising a desired laminating material etc. if necessary laminated on a heat-storage object by laminating the laminating material etc. at the time of forming.

In view of the problems of the heat-storage objects disclosed in Patent Literatures 1 and 2 and Non-Patent Literature 1, second object of the present invention is to provide a heat-storage object having a high heat-storage material content and hence excellent heat-storage property and not flowing despite the high heat-storage material content, as well as a process for producing the same.

Third object of the present invention is to provide a heat-storage structure comprising a heat-storage object laminated with a laminating material etc., which does not leak the heat-storage material with time and even when subjected to processing such as cutting or punching, does not undergo leakage through the cut surface or hole and has excellent processability.

According to a technical idea different from those described in Patent Literatures 3 and 4, the present invention provides a heat-storage structure improving heat-retaining property in a space by relaxing temperature change attributable to heat transfer, more easily and at lower costs than by providing a heat insulating sheet, or more efficiently than with an air layer and the like.

The present invention provides a heat-storage structure which solves problems (a) and (b) below in Patent Literatures 5, 6 and 7, has a high heat-storage material content and hence excellent heat-storage property, does not leak the heat-storage material with time, and even when subjected to processing such as cutting or punching, does not undergo leakage through the cut surface or hole, and has excellent processability.

(a) The latent heat-storage material undergoes phase change (solid/liquid change), and thus requires a strong casing capable of enduring volume change etc. associated with the phase change, but this casing may prevent effective heat transfer to the latent heat-storage material itself so that heat-storage property may not be sufficiently exhibited. In addition, the shape of the heat-storage object is limited by the casing size, but processing such as cutting is not feasible because of leakage of the latent heat-storage material. Application by nailing is not feasible because of leakage of the latent heat-storage material, and when the heat-storage object is fixed in the vertical direction, the latent heat-storage material is distributed in higher density at the bottom, so the latent heat-storage material cannot be effectively utilized.

(b) In the latent heat-storage object using an encapsulated latent heat-storage material, the capsules prevent heat from effectively transferring to the latent heat-storage material itself so that heat-storage property cannot be effectively utilized and relaxation of a change in temperature in a space attributable to the influence of outside air temperature cannot be expected. Further, the heat-storage object may not exhibit sufficient heat-storage property because of a low latent heat-storage material content.

The heat-storage object disclosed in Patent Literature 8 necessitates a hydrate containing a large amount of crystal water in order to store heat with high frequency waves. When a hydrate containing a large amount of crystal water is increased, the content of a crystalline organic compound (paraffin) is relatively decreased, and thus the heat-storage object is made inferior in heat-retaining property and heat-storage property. In addition, water volatilization easily occurs, resulting in rupture of the heat-storage object and change of the physical properties of the heat-storage material, so the heat-storage object may not be re-utilizable for a long time.

The object of the present invention is to provide a heat-storage structure which can easily store heat with microwaves, for example with a household microwave oven, can secure heat-retaining property for a long time upon irradiation with microwaves, can suppress cracking and deterioration attributable to the volume expansion of the heat insulator upon irradiation with microwaves, and is thus excellent in durability and capable of reutilization for a long time.

Means for Solving the Problems

To solve the problems described above, the present inventors made extensive study, and as a result, they found that a heat-storage object obtained by mixing an organic latent heat-storage material (a), a nonionic surfactant (b) and a compound (c-1) having reactive functional group with a compound (c-2) having a second reactive functional group reactive with the reactive functional group, dispersing the organic latent heat-storage material (a) to bring it into colloidal state, and reacting the component (c-1) with the component (c-2), has excellent heat-storage property, does not leak the heat-storage material, and has excellent processability and applicability, and the present invention was thereby completed.

That is, the present invention has the following characteristics:

1. A composition for heat-storage object formation, comprising an organic latent heat-storage material (a), a nonionic surfactant (b) and a compound (c-1) having reactive functional group.
2. The composition for heat-storage object formation according to 1., wherein hydrophile-lipophile balance (HLB) of the nonionic surfactant (b) is 10 or more.
3. The composition for heat-storage object formation according to 1. or 2., which further comprises an organically treated layered clay mineral (d) as a viscosity regulator in an amount of 0.5 to 50 parts by weight based on 100 parts by weight of the organic latent heat-storage material (a).
4. A heat-storage object comprising an organic latent heat-storage material (a) in the form of fine particles fixed with a binder (c).
5. The heat-storage object according to 4., further comprising a layered clay mineral (d), wherein the organic latent heat-storage material (a) and the layered clay mineral (d) are fixed in the form of fine particles with the binder (c).
6. The heat-storage object according to 5., wherein the amount of the layered clay mineral (d) added is 0.5 to 50 parts by weight based on 100 parts by weight of the organic latent heat-storage material (a).
7. The heat-storage object according to any one of 4. to 6., wherein the binder (c) has a segment generating heat with microwaves.
8. The heat-storage object according to any one of 4. to 7., wherein the binder (c) is formed by reacting the compound (c-1) having reactive functional group with a compound (c-2) having a second reactive functional group reactive with the reactive functional group.
9. The heat-storage object according to any one of 4. to 8., wherein the content of the organic latent heat-storage material (a) is 40 wt % or more.
10. A heat-storage structure comprising the heat-storage object of any one of 4. to 9. formed into a sheet, at least one side of which is laminated with a laminating material.
11. The heat-storage structure according to 10., wherein the laminating material is a heat conductor.
12. The heat-storage structure according to 11., wherein the laminating material is a flame-retardant or nonflammable material.
13. The heat-storage structure according to 10., wherein the laminating material is a heat insulator having a heat conductivity of less than 0.1 W/(m·K).
14. The heat-storage structure according to 10., further comprising a heating element laminated therein.
15. The heat-storage structure according to 14., further comprising a heat insulator laminated on the heating element.
16. A heat-storage structure comprising the heat-storage object of any one of 4. to 9. covered with a surface material.
17. A process for producing a heat-storage object, which comprises mixing a composition for heat-storage object formation, containing an organic latent heat-storage material (a), a nonionic surfactant (b) and a compound (c-1) having reactive functional group, with a compound (c-2) having a second reactive functional group reactive with the reactive functional group, dispersing the organic latent heat-storage material (a) to bring it into a colloidal state, reacting the component (c-1) with the component (c-2) to form a binder (c) and thereby fix the organic latent heat-storage material (a) in the form of fine particles with the binder (c).
18. The process for producing a heat-storage object according to 17., wherein hydrophile-lipophile balance (HLB) of the nonionic surfactant (b) is 10 or more.
19. The process for producing a heat-storage object according to 17. or 18., wherein an organically treated layered clay mineral (d) is further mixed as a viscosity regulator in an amount of 0.5 to 50 parts by weight based on 100 parts by weight of the organic latent heat-storage material (a).
20. The process for producing a heat-storage object according to any one of 17. to 19., wherein the content of the organic latent heat-storage material (a) is 40 wt % or more.

Effect of the Invention

The composition for heat-storage object formation described in 1 above is formed into a reactive curable composition by mixing a compound (c-1) having reactive function group with a compound (c-2) having a second reactive functional group reactive with the reactive functional group, and then the reactive curable composition is formed in a desired shape by being cured, thereby producing a heat-storage object which can be in any desired shape, has high heat-storage material content and hence excellent heat-storage property, does not leak the heat-storage material with time despite high heat-storage material content, and upon subjection of the heat-storage object to processing such as cutting or punching, does not leak the heat-storage material through the cut surface or hole and has excellent processability. At the time of forming, the heat-storage object may be laminated if necessary with a desired laminating material etc., and thereby a heat-storage structure comprising the heat-storage object laminated with the laminating material etc. can be produced.

The heat-storage object in 4. above has a high heat-storage material content and hence excellent heat-storage property, does not leak the heat-storage material with time despite the high heat-storage material content, and which upon cutting of the heat-storage object, does not leak the heat-storage material through the cut surface and has excellent processability, and upon nailing etc., does not leak the heat-storage material and is thus excellent in attachment applicability.

The heat-storage structure in 10. above is excellent in heat-storage property, does not leak the heat-storage material with time, and upon subjection to processing such as cutting, punching and nailing or upon application, does not leak the heat-storage material through the cut surface etc. and is thus excellent in processability and applicability.

The heat-storage structure in 11. above relaxes temperature change in space temperature due to heat transfer and exhibits excellent heat-retaining property, and can reduce energy consumption in heating, cooling etc. In winter and at night, dew condensation can also be prevented.

The heat-storage structure in 13. above exhibit excellent heat-storage/heat insulating properties in addition to the effect of the invention in 4. above, and when used for example in an architectural structure, can maintain comfortable environment with less fluctuation in space temperature against change in outside air temperature and can achieve energy saving.

The heat-storage structure in 14. above is suitable as a floor heating structure, can exhibit excellent heat-retaining property, reduce power consumption and maintain comfortable living environment. The heat-storage material is not leaked with time, and even if the heat-storage structure is cut, the heat-storage material is not leaked out through the cut surface and the heat-storage structure is excellent in processability, or the heat-storage material is not leaked out by nailing, so the heat-storage structure is excellent in attachment applicability.

The heat-storage structure in 16. above is a heat-storage structure which can store heat by using remaining heat and waste heat and can be utilized as a warmer, and particularly at least one of the compound (c-1) and the compound (c-2) constituting a binder has a segment vibrated with microwaves to generate heat, thus enabling easy storage of heat by irradiation with microwaves, for example with a microwave oven, and which by irradiation with microwaves, can secure heat-retaining property for a long time and can suppress cracking and deterioration attributable to the volume expansion of the heat insulator upon irradiation with microwaves.

According to the producing process in 17 above, it is possible to produce a heat-storage object which has a high heat-storage material content and hence excellent heat-storage property and does not leak the heat-storage material with time despite the high heat-storage material content. The resulting heat-storage object, even when cut, does not leak the heat-storage material through the cut surface and is thus excellent in processability, and does not leak the heat-storage material even by nailing etc. and is thus excellent in attachment applicability.

Figure 1:
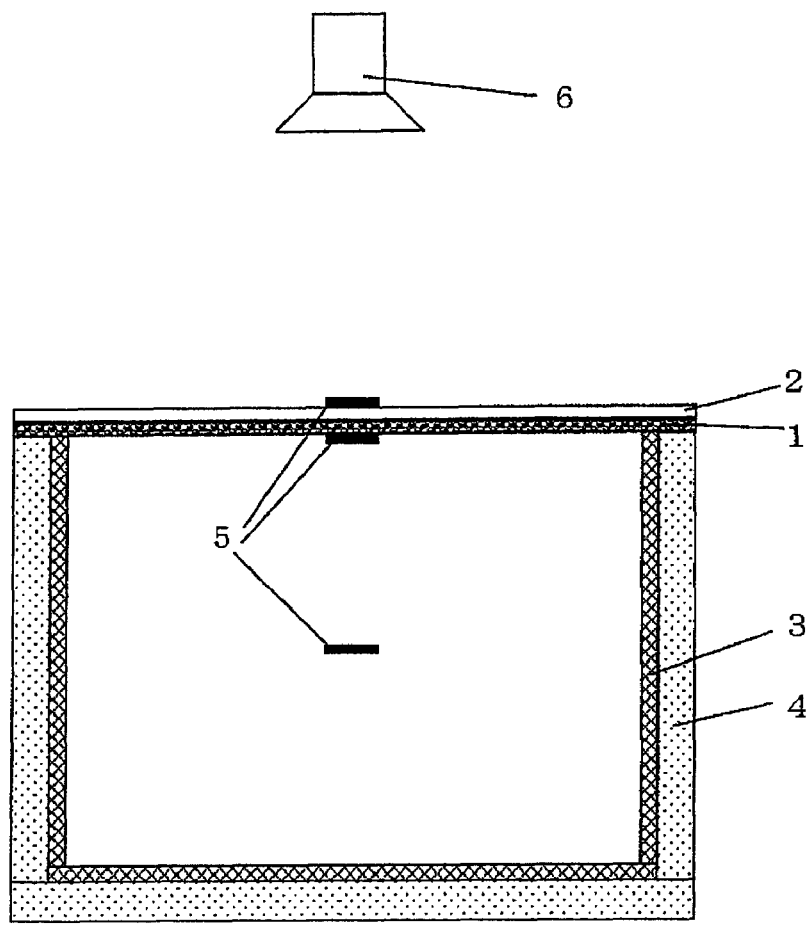
FIG. 1 is a sectional view of the sample box used in Example 2-1.

| | Description of Symbols |
|---|---|
| 1 | heat-storage object |
| 2 | glass plate |
| 3 | acrylic plate |
| 4 | polystyrene foam |
| 5 | thermocouple |
| 6 | infrared lamp |
| 7 | heat-storage object 1 |
| 8 | sheet heating element |
| 9 | floor material |
| 10 | plywood |

-continued

| | Description of Symbols |
|---|---|
| 11 | polystyrene foam |
| 12 | thermocouple |
| 13 | temperature controller (thermostat) |

BEST MODE FOR CARRYING OUT THE INVENTION

The heat-storage object of the present invention is formed by mixing an organic latent heat-storage material (component (a)), a nonionic surfactant (component (b)), a compound (component (c-1)) having reactive functional group and a compound (component (c-2)) having a second reactive functional group reactive with the reactive functional group, and reacting the component (c-1) with the component (c-2). These components may be mixed respectively to react with each other, but a 2-component system consisting of a composition for heat-storage object formation containing the organic latent heat-storage material (a), the nonionic surfactant (b) and the compound (c-1) having reactive function group, and the component (c-2) is preferably used because the heat-storage object can be easily produced by mixing the composition for heat-storage object formation with the component (c-2) to form a reactive curable composition, and then curing the reactive curable composition.

As the component (c-1) constituting the composition for heat-storage object formation of the present invention, a component which is stable even when mixed with the organic latent heat-storage material (component (a)), the nonionic surfactant (component (b)) and other components added if necessary is selected and used. Specifically when a compound having an isocyanate group, carboxyl group, imido group or aldehyde group as the reactive functional group is used as the component (c-1), use of a long-chain alcohol or polyether compound as the heat-storage material (a) is not suitable, and when a compound having a hydroxyl group, epoxy group, carbodiimide group, oxazoline group or aziridine group as the reactive functional group is used as the component (c-1), use of a long-chain fatty acid as the heat-storage material (a) is not suitable.

In the process for producing the heat-storage object of the present invention, the component (b) can be used to disperse the component (a) to bring it into fine colloidal state in the component (c-1) and/or the component (c-2). In this state, the component (c-1) is reacted with the component (c-2), whereby a heat-storage object having the component (a) dispersed finely in a binder component (c) consisting of the components (c-1) and (c-2) can be produced.

The heat-storage object and heat-storage structure obtained by this producing process can increase the content of the component (a) and can thus exhibit excellent heat-storage property, and does not leak the component (a) with time despite the high content of the component (a). Even when the heat-storage object of the present invention is cut, the heat-storage object does not leak the component (a) from the cut surface and is excellent in processability, and does not leak the component (a) upon nailing etc. and is thus excellent in attachment applicability.

Because the component (a) is dispersed uniformly in the form of fine particles in the heat-storage object of the present invention, a change in shape of the heat-storage object attributable to volume change associated with the solid/liquid change of the component (a) can be reduced.

In the present invention, it was found that in production of the heat-storage object, the component (b) is mixed, and the component (a) is dispersed in a finely colloidal state (inhomogeneous state), and from this state, the binder (c) is formed, whereby the above effect can be achieved.

When the component (b) is not contained and when the component (a) is not compatible with the component (c-1) and/or the component (c-2), the component (a) is separated from the component (c-1) and/or the component (c-2), so the heat-storage object is hardly formed. When the component (a) is compatible with the component (c-1) and/or the component (c-2) (homogeneous state), a heat-storage object having high heat-storage property can be formed, but because the selection (combination etc.) of the component (c-1) and/or the component (c-2) is limited, the heat-storage object is hardly usable in various applications.

<Component (a)>

The component (a) includes, for example, an aliphatic hydrocarbon, a long-chain alcohol, a long-chain fatty acid, a long-chain fatty acid ester, a polyether compound, and a fatty acid triglyceride, and these can be used alone or as a mixture of two or more thereof.

Such component (a) is preferable because it has a high boiling point to make it hardly volatilized, thus undergoing less volume change (localized necking) at the time of formation of the heat-storage object and maintaining heat-storage property for a long time. When the organic latent heat-storage material is used, establishment of phase-change temperature depending on applications is easy, and phase-change temperature can be easily established for example by mixing two or more organic latent heat-storage materials different in phase change temperature.

As the aliphatic hydrocarbon, an aliphatic hydrocarbon having 8 to 36 carbon atoms for example can be used, and specific examples include n-decane (melting point −30° C.), n-undecane (melting point −25° C.), n-dodecane (melting point −8° C.), n-tridecane (melting point −5° C.), n-pentadecane (melting point 6° C.), n-tetradecane (melting point 8° C.), n-hexadecane (melting point 17° C.), n-heptadecane (melting point 22° C.), n-octadecane (melting point 28° C.), n-nonadecane (melting point 32° C.), eicosane (melting point 36° C.), and docosane (melting point 44° C.), as well as n-paraffin and paraffin wax composed of mixtures thereof.

As the long-chain alcohol, a long-chain alcohol having 8 to 36 carbon atoms for example can be used, and specific examples include capryl alcohol (melting point 7° C.), lauryl alcohol (melting point 24° C.), myristyl alcohol (melting point 38° C.), stearyl alcohol (melting point 58° C.) and the like.

As the long-chain fatty acid, a long-chain fatty acid having 8 to 36 carbon atoms for example can be used, and specific examples include octanoic acid (melting point 17° C.), decanoic acid (melting point 32° C.), dodecanoic acid (melting point 44° C.), tetradecanoic acid (melting point 50° C.), hexadecanoic acid (melting point 63° C.), octadecanoic acid (melting point 70° C.) and the like.

As the long-chain fatty acid ester, a long-chain fatty acid ester having 8 to 36 carbon atoms for example can be used, and specific examples include methyl laurate (melting point 5° C.), methyl myristate (melting point 19° C.), methyl palmitate (melting point 30° C.), methyl stearate (melting point 38° C.), butyl stearate (melting point 25° C.), methyl arachate (melting point 45° C.) and the like.

The polyether compound includes, for example, diethylene glycol, triethylene glycol, tetraethylene glycol, triethylene glycol monomethyl ether, tetraethylene glycol dimethyl ether, polypropylene glycol, polyethylene glycol, polypropylene glycol diacrylate, ethyl ethylene glycol, and the like.

The fatty acid triglyceride includes, for example, vegetable oils such as palm oil and palm kernel oil, and middle-chain fatty acid triglyceride and long-chain fatty acid triglyceride that are refined processed products of the vegetable oils.

In the present invention, an aliphatic hydrocarbon having 8 to 36 carbon atoms, a long-chain alcohol having 8 to 36 carbon atoms, a long-chain fatty acid having 8 to 36 carbon atoms and a long-chain fatty acid ester having 8 to 36 carbon atoms are particularly preferably used as the heat-storage material, among which an aliphatic hydrocarbon having 8 to 36 carbon atoms and a long-chain fatty acid ester having 8 to 36 carbon atoms are preferably used. Among them, a long-chain fatty acid ester having 8 to 36 carbon atoms, preferably a long-chain fatty acid ester having 15 to 22 carbon atoms is preferably used, and such long-chain fatty acid ester has a high quantity of latent heat and has a phase change temperature (melting point) in practical temperature range and can thus be easily used in various applications.

When the heat-storage material having a long-chain alkyl group having 8 to 36 carbon atoms is used as the component (a), a nonionic surfactant having a long-chain alkyl group having 8 to 36 carbon atoms in the structure of the component (b) is preferably used in the present invention. The effect of the present invention can be increased particularly by selecting the components (a) and (b) having long-chain alkyl groups which are approximately identical or identical in the number of carbon atoms.

In the component (a) illustrated above, a compound having a melting point of 0° C. or more is used as the heat-storage material when used exclusively in heating such as in floor heating.

<Component (e)>

When a mixture of two or more organic latent heat-storage materials is used in the present invention, a compatibilizing agent (also referred to hereinafter as "component (e)") is preferably used. By using the component (e), the compatibility between the organic latent heat-storage materials can be improved.

The component (e) includes, for example, a fatty acid triglyceride, a nonionic surfactant having a hydrophile-lipophile balance (HLB) of 1 to less than 10 (preferably 1 to 5), etc., and these can be used alone or as a mixture of two or more thereof.

As described above, the fatty acid triglyceride is a substance also used as an organic latent heat-storage material. Such fatty acid triglyceride is preferable because it can further improve the compatibility between organic latent heat-storage materials and exhibits excellent heat-storage property. The fatty acid triglyceride includes, for example, vegetable oils such as palm oil and palm kernel oil, and refined processed products thereof, that is, fatty acid triglycerides such as triglyceride caprylate, triglyceride palmitate, triglyceride stearate etc., and these can be used alone or as a mixture of two or more thereof.

The nonionic surfactant having hydrophile-lipophile balance (HLB) of 1 to less than 10 (preferably 1 to 5) includes, for example, sorbitan fatty acid esters such as sorbitan monolaurate, sorbitan monopalmitate, sorbitan monostearate, sorbitan monooleate, sorbitan tristearate, sorbitan trioleate, sorbitan sesquioleate, and the like.

The mixing ratio of the component (e) to the component (a) is usually about 0.1 to 20 parts by weight (preferably 0.1 to 10 parts by weight) of the compatibilizing agent to 100 parts by weight of the component (a).

<Component (b)>

The component (b) in the present invention includes, for example, polyoxyethylene sorbitan fatty acid esters such as polyoxyethylene sorbitan monolaurate, polyoxyethylene sorbitan monopalmitate, polyoxyethylene sorbitan monostearate, and polyoxyethylene sorbitan monooleate, polyoxyethylene alkyl ethers such as polyoxyethylene lauryl ether, polyoxyethylene cetyl ether, polyoxyethylene stearyl ether, polyoxyethylene oleyl ether, and polyoxyethylene octyl dodecyl ether, polyoxyethylene sorbitol fatty acid esters such as polyoxyethylene sorbit tetraoleate, polyoxyethylene fatty acid esters such as polyethylene glycol monolaurate, polyethylene glycol monostearate, polyethylene glycol distearate, and polyethylene glycol monooleate, and polyoxyethylene hardened castor oil, polyoxyethylene palm oil fatty acid sorbitan, and the like.

In the present invention, a nonionic surfactant having a hydrophile-lipophile balance (HLB) of 10 or more (preferably greater than 10 to 20, more preferably 11 to 19, more preferably 12 to 18, most preferably 13 to 17) can be preferably used. Given such range, the component (a) that is an organic latent heat-storage material can be preferably easily dispersed in colloidal state.

The mixing ratio of the component (b) to the component (a) is usually preferably 0.01 to 30 parts by weight, more preferably 0.1 to 20 parts by weight of the component (b) to 100 parts by weight of the component (a).

When the component (b) is less than 0.01 part by weight, the component (a) is separated from the component (c-1) and/or the component (c-2) or there easily occurs creaming phenomenon, the component (a) is not efficiently dispersed as colloid, or it is highly possible that the component (a) is made compatible with the component (c-1) and/or the component (c-2), and the effect of the present invention may not be achieved. When the component (b) is higher than 30 parts by weight, the strength of the resulting heat-storage object may be lowered.

<Component (d)>

In the present invention, the component (a) may also be mixed with an organically treated layered clay mineral (also referred to hereinafter as "component (d)"). By mixing the component (d) with the component (a), the component (a) penetrates into between layers of the component (d). The component (d) is organically treated and thus the component (a) easily penetrates into between layers of the component (d), and the component (a) is easily held between layers of the component (d).

By mixing the component (d) with the component (a), the viscosity of the component (a) can be increased, and the component (a) can be held more reliably in the binder component (c). Accordingly, the component (a) can be prevented from leaking to the outside, and a heat-storage object excellent in heat-storage property and excellent in processability and applicability can be obtained.

The component (d) hardly reacts with the organic latent heat-storage material and hardly influences the melting point and other physical properties of the organic latent heat-storage material, and thus the heat-storage material can efficiently exhibit its property, and the phase change temperature (melting point) of the heat-storage material can be preferably easily established.

The bottom distance of the component (d) is preferably 13.0 to 30.0 Å, more preferably about 15.0 to 26.0 Å. Given such range, the component (a) can easily penetrate into between layers of the component (d). The bottom distance is a value calculated from (001) reflection in X-ray diffraction pattern.

The viscosity of the components (a) and (d) when mixed is preferably about 0.5 to 20.0 Pa·s. The viscosity is a value measured by Brookfield rotational viscometer at temperature of 23° C. at 50% relative humidity. The TI value of the components (a) and (d) when mixed is preferably 4.0 to 9.0. The TI value is a value determined with Brookfield rotational viscometer by the following equation (1):

$$TI\ value = \eta 1/\eta 2 \qquad (1)$$

wherein η1 is viscosity at 2 rpm (Pa·s: indicator value at the second revolution), and η2 is viscosity at 20 rpm (Pa·s: indicator value at the fourth revolution).

By such viscosity and TI value, the component (a) can be easily stably dispersed and retained in the composition for heat-storage object formation or in the reactive curable composition at the time of production of the heat-storage object, and after production of the heat-storage object, the component (a) is easily retained for a long time in the binder (c).

Accordingly, the component (a) is prevented from leaking to the outside of the heat-storage object, and a heat-storage object and a heat-storage structure more excellent in heat-storage property and more excellent in processability and applicability can be obtained.

As the component (d), an organically treated layered clay mineral can be used without particular limitation. The layered clay mineral includes, for example, smectite, vermiculite, kaolinite, allophane, mica, talc, halloysite, sepiolite and the like. Swellable fluorine mica, swellable synthetic mica and the like can also be utilized.

The organic treatment includes, for example, a process which involves ion exchange (intercalation) of cations present between layers of layered clay mineral, with long-chain alkyl ammonium ions and the like.

In the present invention, smectite and vermiculite are particularly easily organically treated and can thus be preferably used. In the smectite, montmorillonite is particularly preferably used, and in the present invention, organically treated montmorillonite is particularly preferably used.

Specific examples of the organically treated montmorillonite can include Esben, Esben C, Esben E, Esben W, Esben P, Esben WX, Esben NX, Esben NZ, Esben N-400, Organite, Organite-D, Organite-T (trade names) manufactured by Hojun Co., Ltd., TIXOGEL MP, TIXOGEL VP, TIXOGEL VP, TIXOGEL MP, TIXOGEL EZ 100, MP 100, TIXOGEL UN, TIXOGEL DS, TIXOGEL VP-A, TIXOGEL VZ, TIXOGEL PE, TIXOGEL MP 250, TIXOGEL MPZ (trade names) manufactured by Dudo Chemie, BENTONE 34, 38, 52, 500, 1000, 128, 27, SD-1, SD-3 (trade names) manufactured by Elementis Japan K.K., and the like. Usually the mixing ratio of the component (d) to the component (a) is preferably about 0.5 to 50 parts by weight, more preferably about 1 to 30 parts by weight, still more preferably about 3 to 20 parts by weight of the component (d) to 100 parts by weight of the component (a). When the component (d) is lower than 0.5 part by weight, the component (a) can easily leak from the component (c), while when the component (d) is greater than 50 parts by weight, the component (a) has so high viscosity that the process of supporting and holding the component (a) on the component (c) may be made difficult.

<Component (f)>

In the composition for heat-storage object formation, the heat-storage object, the heat-storage structure, and the process for producing the heat-storage object according to the present invention, a heat conducting substance can also be used. By mixing the heat conducting substance (referred to hereinafter as "component (f)"), the transfer of heat in the heat-storage object can be made smooth to improve the heat efficiency of the heat-storage material.

The heat conducting substance (f) component includes, for example, metals such as copper, iron, zinc, beryllium, magnesium, cobalt, nickel, titanium, zirconium, molybdenum, tungsten, boron, aluminum, gallium, silicon, germanium, and tin, alloys thereof, or metal compounds containing these metals, such as metal oxides, metal nitrides, metal carbides, and metal phosphides, and graphite such as flaky graphite, massive graphite, earthy graphite, and fibrous graphite, and these can be used alone or as a mixture of two or more thereof.

The heat conductivity of the heat conducting substance (f) component is preferably 1 W/(m·K) or more, more preferably 3 W/(m·K) or more, still more preferably 5 W/(m·K) or more. By mixing the heat conducting substance (f) having such heat conductivity, the heat efficiency of the heat-storage material can be improved more efficiently. The heat conducting substance is used preferably as fine particles, and the average particle diameter of the fine particles is preferably 1 to 100 μm, more preferably 5 to 50 μm.

Usually the mixing ratio of the component (f) to the component (a) is preferably 5 to 200 parts by weight, preferably 10 to 80 parts by weight, more preferably 20 to 60 parts by weight of the component (f) to 100 parts by weight of the component (a). When the component (f) is lower than 5 parts by weight, heat-storage property is hardly improved. When the component (f) is higher than 200 parts by weight, the viscosity is increased to make efficient supporting on the binder difficult in some cases.

<Component (c-1), Component (c-2)>

The component (c-1) and component (c-2) used in the present invention are components allowed to react with each other, thereby forming a binder (component (c)) to support and hold the component (a), and forming the heat-storage material in a predetermined shape. That is, the heat-storage object of the present invention has the organic latent heat-storage material (a) in the form of fine particles fixed with the binder (c).

The binder (c) in the heat-storage object and the heat-storage structure of the present invention is formed by reacting the component (c-1) having reactive functional group with the component (c-2) having a second reactive functional group reactive with the reactive functional group. The combination of reactive functional groups of the components (c-1) and (c-2) includes combinations of a hydroxyl group and an isocyanate group, a hydroxyl group and a carboxyl group, a hydroxyl group and an imido group, a hydroxyl group and an aldehyde group, an epoxy group and an amino group, an epoxy group and a carboxyl group, an epoxy group and a polycarboxylic anhydride, a carboxyl group and a carbodiimide group, a carboxyl group and an oxazoline group, a carbonyl group and a hydrazide group, a carboxyl group and an aziridine group, and an alkoxyl group and an alkoxyl group. Any of these functional groups may be the reactive functional group of the component (c-1) or the second reactive functional group, but the component (c-1) shall be a compound having a reactive functional group not reacting with the organic latent heat-storage material (a), the nonionic surfactant (b) and optionally added other components. In the present invention, it is particularly preferable that the component (c-1) is a compound having a hydroxyl group, and the component (c-2) is a compound having an isocyanate group.

The compound having reactive functional group can be exemplified by the following compounds:

[A] Compound Having Hydroxyl Group

The compound having hydroxyl group includes:

[1] polyols such as polyester polyol, acrylic polyol, polycarbonate polyol, polyolefin polyol, polyether polyol, polybutadiene polyol, epoxy polyol, alkyd polyol, fluorine-containing polyol and silicon-containing polyol;

[2] hydroxy group-containing monomers;

[3] polyhydric alcohols; and

[4] polysaccharides such as cellulose and/or derivatives thereof, and amylose.

Among the compounds having hydroxyl group, it is particularly preferable in the present invention to use one or more compounds selected from polyester polyol, acrylic polyol, polyether polyol, polyolefin polyol, cellulose and derivatives thereof. By using such compounds having hydroxyl group, a dense crosslink structure can be formed, and the binder (c) which is excellent in compatibility with the component (a) and can easily suppress leakage of the component (a) out of the heat-storage object can be preferably formed. These compounds do not react with the component (a), the component (b) and other components added if necessary, and are thus preferable as component (c-1) constituting the composition for heat-storage object formation. In a preferable aspect, the above compound having hydroxyl group is used in combination with polyol and another compound, particularly the polyhydric alcohol [3], in order to form a heat-storage object having higher strength.

[1] Polyol (Polyester Polyol)

Polyester polyol includes, for example, condensation polymers of polyhydric alcohol and polyvalent carboxylic acid; ring-opening polymerization products of cyclic ester (lactone); and reaction products of 3 components, that is, polyhydric alcohol, polyvalent carboxylic acid and cyclic ester.

The polyvalent carboxylic acid includes, for example, aliphatic dicarboxylic acids such as malonic acid, maleic acid, maleic anhydride, succinic acid, glutaric acid, adipic acid, suberic acid, azelaic acid, sebacic acid, and dodecanedionoic acid;

alicyclic dicarboxylic acids such as 1,4-cyclohexanedicarboxylic acid; and aromatic dicarboxylic acids such as terephthalic acid, isophthalic acid, orthophthalic acid, phthalic anhydride, terephthalic acid, 2,6-naphthalenedicarboxylic acid, paraphenylenedicarboxylic acid, and trimellitic acid.

As polyhydric alcohols constituting the polyester polyol, compounds enumerated in [3] polyhydric alcohol below can be used.

A ring opening polymerization product (lactone polyol) of cyclic ester includes, for example, a propiolactone polymer, a β-methyl-δ-valerolactone polymer, an ε-caprolactone polymer (polycaprolactone polyol) and the like.

In the reaction product of the 3 components, the polyhydric alcohol, polyvalent carboxylic acid, and cyclic ester can be those described above.

In the present invention, a condensation polymer of polyhydric alcohol with polyvalent carboxylic acid is particularly preferably used as the polyester polyol. For example, it is preferable to use polyester polyols wherein 2,4-diethyl-1,5-pentamethylenediol, 3-methyl-1,5-pentamethylenediol or 2-butyl-2-ethyl-1,3-propanediol is used as polyhydric alcohol and adipic acid or the like is used as polyvalent carboxylic acid.

The process for producing the polyester polyol can be carried out in a usual manner, and if necessary a known curing agent, a curing catalyst and the like may also be used.
(Acrylic Polyol)

The acrylic polyol can be obtained for example by homopolymerization or copolymerization of acrylic monomers having one or more hydroxyl groups in one molecule or by copolymerization thereof with another copolymerizable monomer.

The acrylic monomer having one or more hydroxyl groups in one molecule include, for example, (meth)acrylates such as 2-hydroxyethyl(meth)acrylate, 2-hydroxymethyl(meth)acrylate, 2-hydroxypropyl(meth)acrylate, 3-hydroxypropyl(meth)acrylate, 2-hydroxybutyl(meth)acrylate, and 4-hydroxybutyl(meth)acrylate;

(meth) acrylic monoesters of triol such as glycerin and trimethylol propane;

monoethers of the above (meth)acrylates with polyether polyols such as polyethylene glycol, polypropylene glycol, and polybutylene glycol;

adducts having glycidyl(meth)acrylate added to monobasic acids such as acetic acid, propionic acid, and p-tert-butylbenzoic acid; and adducts obtained by ring-opening polymerization of the above (meth)acrylates with lactones such as ε-caprolactam and γ-valerolactone;

acrylic polyol can be obtained by homopolymerizing or copolymerizing these.

Another copolymerizable monomer includes:

carboxyl group-containing monomers such as (meth)acrylic acid, crotonic acid, maleic acid, itaconic acid, fumaric acid, isocrotonic acid, salicylic acid, and cinnamic acid;

amino group-containing monomers such as aminomethyl (meth)acrylate, aminoethyl(meth)acrylate, aminopropyl (meth)acrylate, aminobutyl(meth)acrylate, butylvinylbenzylamine, vinylphenylamine, p-aminostyrene, N-methylaminoethyl(meth)acrylate, N-t-butylaminoethyl (meth)acrylate, N,N-dimethylaminoethyl(meth)acrylate, N,N-dimethylaminopropyl(meth)acrylate, N,N-diethylaminoethyl(meth)acrylate, N,N-dimethylaminopropyl(meth)acrylate, N,N-diethylaminopropyl(meth)acrylate, N-[2-(meth)acryloyloxyethyl]piperidine, N-[2-(meth)acryloyloxyethyl]pyrrolidine, N-[2-(meth)acryloyloxyethyl]morpholine, 4-[N,N-dimethylamino]styrene, 4-[N,N-diethylamino]styrene, 2-vinyl pyridine, and 4-vinyl pyridine;

epoxy group-containing monomers such as glycidyl (meth)acrylate, diglycidyl fumarate, 3,4-epoxycyclohexyl (meth)acrylate, 3,4-epoxyvinylcyclohexane, allyl glycidyl ether, ε-caprolactone-modified glycidyl(meth)acrylate, and β-methylglycidyl(meth)acrylate;

amido group-containing monomers such as (meth) acrylamide, N-(methylol) (meth)acrylamide, diacetone (meth)acrylamide, N-monoalkyl(meth)acrylamide, N-isobutoxymethyl acrylamide, N,N-dialkyl(meth)acrylamide, 2-(dimethylamino) ethyl(methacrylate), N-[3-(dimethylamino)propyl](meth)acrylamide, and vinylamide;

alkoxysilyl group-containing monomers such as trimethoxysilylpropyl(meth)acrylate and triethoxysilylpropyl (meth)acrylate;

hydrolysable silyl group-containing monomers such as vinyltrimethoxysilane, vinylmethyldimethoxysilane, and γ-(meth)acryloropyltrimethoxysilane;

nitrile group-containing monomers such as acrylonitrile and methacrylonitrile;

methylol group-containing monomers such as N-methylol (meth)acrylamide;

oxazoline group-containing monomers such as vinyl oxazoline and 2-propenyl-2-oxazoline;

(meth)acrylates such as methyl(meth)acrylate, ethyl (meth)acrylate, isopropyl(meth)acrylate, n-propyl (meth)acrylate, n-butyl(meth)acrylate, t-butyl(meth)acrylate, sec-butyl(meth)acrylate, isobutyl(meth)acrylate, 2-ethylhexyl (meth)acrylate, n-hexyl(meth)acrylate, cyclohexyl(meth)acrylate, octyl(meth)acrylate, lauryl (meth)acrylate, stearyl (meth)acrylate, glycidyl (meth)acrylate, trifluoroethyl(meth)acrylate, n-amyl (meth)acrylate, isoamyl(meth)acrylate, oxytyl(meth)acrylate, decyl(meth)acrylate, dodecyl(meth)acrylate, dodecenyl (meth)acrylate, octadecyl(meth)acrylate, cyclohexyl (meth)acrylate, 4-tert-butylcyclohexyl(meth)acrylate, phenyl (meth)acrylate, isobornyl(meth)acrylate, benzyl (meth)acrylate, 2-phenylethyl(meth)acrylate, 2-methoxyethyl (meth)acrylate, and 4-methoxybutyl(meth)acrylate;

vinylidene halide monomers such as vinylidene fluoride; and aromatic vinyl monomers such as styrene, 2-methylstyrene, vinyltoluene, t-butylstyrene, vinyl anisole, vinyl naphthalene, and divinyl benzene; and other monomers such as ethylene, propylene, isoprene, butadiene, vinyl acetate, vinyl ether, vinyl ketone, and silicone macromer, and these can be used alone or as a mixture of two or more thereof.

The polymerization process is not particularly limited, and known bulk copolymerization, suspension polymerization, solution polymerization, dispersion polymerization, emulsion polymerization, redox polymerization and the like may be used, and if necessary an initiator, a chain transfer agent and other additives may be added. The acrylic polyol can be obtained for example by solution polymerization of the above-mentioned monomer components in the presence of a known radical polymerization initiator such as a peroxide and azo compound.
(Polyether Polyol)

The polyether polyol can be exemplified by compounds obtained by ring-opening addition of cyclic ether compounds such as ethylene oxide, propylene oxide, and tetrahydrofuran by using, as the initiator, one or more compounds selected from compounds illustrated as the polyhydric alcohol [3]. The polyether polyol can be exemplified more specifically by polyethylene glycol, polyoxypropylene polyol, and polyoxytetramethylene polyol.

The polyether polyol includes, for example, polyols known in the field of polyurethane, such as polyethylene glycol, polypropylene glycol, polyethylene-propylene glycol, polytetramethylene glycol, and polyethylene glycol monoalkyl ether, and polyalkylene glycol monoalkyl ethers such as polypropylene glycol monoalkyl ether. The polyether polyol may be composed of one kind of monomer component or a copolymer containing a plurality of alkylene oxides.
(Polycarbonate Polyol)

The polycarbonate polyol includes, for example, reaction products of polyhydric alcohols with phosgene; and ring-opening polymerization products of cyclic carbonates (alkylene carbonate etc.).

In the ring-opening polymerization products of cyclic carbonates, an alkylene carbonate includes, for example, ethylene carbonate, trimethylene carbonate, tetramethylene carbonate, hexamethylene carbonate and the like.

The polycarbonate polyol may be a compound having a carbonate linkage in its molecule with a hydroxyl group at the terminal thereof and may have an ester linkage in addition to the carbonate linkage.

(Polyolefin Polyol)

As the polyolefin polyol, it is possible to use a polyol with a number-average molecular weight of 500 or more, having an olefin as a component of a skeleton (or a main chain) of a polymer or copolymer and having at least 2 hydroxyl groups in the molecule (particularly at the terminal). The olefin may be an olefin having a carbon-carbon double bond at the terminal (for example, α-olefin such as ethylene, propylene etc.) or may be an olefin having a carbon-carbon double bond at a site other than the terminal (for example, isobutene), or may be a diene (for example, butadiene, isoprene etc.).

The hydroxyl value of the polyol is not particularly limited, and is preferably about 20 to 150 KOH mg/g, more preferably about 25 to 120 KOHmg/g, still more preferably about 30 to 80 KOH mg/g.

The molecular weight of the polyol is not particularly limited, and the average molecular weight is desirably 500 to 10000, more desirably 1000 to 3000. Given such molecular weight, a crosslinked structure capable of preventing leakage of the heat-storage material can be obtained by a combination with an isocyanate group-containing compound, a carboxyl group-containing compound and the like. When the molecular weight is too low, the heat-storage material is made brittle, while when the molecular weight is too high, the heat-storage object may be inferior in strength. By using the polyol having a molecular weight in such range, it is possible to obtain a heat-storage object with a high content of the component (a), wherein the component (a) can be dispersed in a finer colloidal state. Accordingly, the resulting heat-storage object is excellent in heat-storage property and can reduce the change in shape of the heat-storage object itself attributable to volume change associated with the solid/liquid change of the component (a). When the polyol having an average molecular weight in the range described above is used as the component (c-1), the reactive curable composition mixed with the component (c-2) can have suitable viscosity and can easily form a heat-storage object or a heat-storage structure.

[2] Hydroxyl Group-Containing Monomer

The hydroxyl group-containing monomer includes, for example, 2-hydroxyethyl(meth)acrylate, 2-hydroxymethyl (meth)acrylate, 2-hydroxypropyl(meth)acrylate, 3-hydroxypropyl(meth)acrylate, 2-hydroxybutyl(meth)acrylate, 4-hydroxybutyl(meth)acrylate, ethyleneglycol mono(meth)acrylate, propyleneglycol mono(meth)acrylate, and glycerol mono(meth)acrylate.

[3] Polyhydric Alcohol

The polyhydric alcohol includes, for example, ethylene glycol, diethyleneglycol, propyleneglycol, dipropyleneglycol, 1,3-propanediol, 1,3-butanediol, 1,4-butanediol, 2,3-butanediol, 1,4-tetramethylenediol, 1,6-hexanediol, 2-methyl-1,3-trimethylenediol, 1,5-pentamethylenediol, trimethyl pentanediol, 2,2,4-trimethyl-1,3-pentanediol, neopentyl glycol, cyclohexanediol, 2-butyl-2-ethyl-1,3-propanediol, 3-methyl-1,5-pentamethylenediol, 2,4-diethyl-1,5-pentamethylenediol, 1,8-octanediol, 1,9-nonanediol, 1,10-decanediol, metaxylyleneglycol, paraxylyleneglycol, bishydroxyethoxybenzene, bishydroxyethyl terephthalate, glycerin, diglycerin, trimethylolpropane, ditrimethylolpropane, trimethylolethane, cyclohexanediols (1,6-hexamethylenediol, 1,4-cyclohexanediol, cyclohexanedimethanol etc.), bisphenols (bisphenol A etc.), sugar alcohols (xylitol, sorbitol etc.), pentaerythritol, dipentaerythritol, 2-methylolpropanediol, ethoxylated trimethylolpropane and the like.

[4] Cellulose and/or Derivatives Thereof

Cellulose and/or derivatives thereof include cellulose, cellulose acetate and cellulose acetate derivatives such as cellulose diacetate and cellulose triacetate, cellulose esters such as methyl cellulose, ethyl cellulose, cellulose acetate butyrate, cellulose acetate propionate, cellulose acetate phthalate and cellulose nitrate, and cellulose ethers such as ethyl cellulose, benzyl cellulose, cyanoethyl cellulose, hydroxymethyl cellulose, hydroxyethyl cellulose, hydroxypropyl cellulose, hydroxypropylmethyl cellulose and carboxymethyl cellulose.

Cellulose and/or derivatives thereof have hydroxyl groups, wherein a part of the hydroxyl groups are preferably substituted with alkoxyl groups (for example, a methoxy group, ethoxy group, propoxy group, butoxy group etc.) and the like.

Specifically, the degree of substitution is preferably 1.8 to 2.8, more preferably 2.2 to 2.6. The degree of substitution means the degree of substitution, with alkoxyl group etc., of 3 hydroxyl groups present in a glucose unit constituting cellulose, and when 100% hydroxyl groups are substituted, the degree of substitution is 3.

When the degree of substitution with alkoxyl groups in cellulose and/or a derivative thereof is regulated in this range, the interaction with the component (a) can be improved, and the component (a) can be maintained in the binder for a long time.

When the degree of substitution is lower than 1.8, the interaction with the component (a) may be deteriorated, and the component (a) may not be sufficiently maintained in the binder. When the degree of substitution is 2.8 or more, hydroxyl groups in cellulose are decreased thus failing to attain a 3-dimensional crosslinked structure having sufficient strength in some cases.

Although the molecular weight of cellulose and/or a derivative thereof is not particularly limited, the average molecular weight is desirably 1000 to 30000, more desirably 5000 to 20000. Given such molecular weight, a crosslinked structure capable of supremely preventing leakage of the heat-storage material can be obtained. When the molecular weight is too low, the heat-storage material is made brittle, while when the molecular weight is too high, the heat-storage object may be inferior in strength.

[B] Isocyanate Group-Containing Compound

The isocyanate group-containing compound includes, for example, aliphatic diisocyanates such as 1,3-trimethylene diisocyanate, 1,4-tetramethylene diisocyanate, 1,3-pentamethylene diisocyanate, 1,5-pentamethylene diisocyanate, 1,6-hexamethylene diisocyanate (HMDI), 1,2-propylene diisocyanate, 1,2-butylene diisocyanate, 2,3-butylene diisocyanate, 1,3-butylene diisocyanate, 2-methyl-1,5-pentamethylene diisocyanate, 3-methyl-1,5-pentamethylene diisocyanate, 2,4,4-trimethyl-1,6-hexamethylene diisocyanate, 2,2,4-trimethyl-1,6-hexamethylene diisocyanate, 2,6-diisocyanatemethyl caproate, lysine diisocyanate and dimer acid diisocyanate;

alicyclic diisocyanates such as 1,3-cyclopentane diisocyanate, 1,4-cyclohexane diisocyanate, 1,3-cyclohexane diisocyanate, 3-isocyanatemethyl-3,5,5-trimethylcyclohexyl isocyanate, 4,4'-methylene bis(cyclohexyl isocyanate), methyl-2,4-cyclohexane diisocyanate, methyl-2,6-cyclohexane diisocyanate, 1,3-bis(isocyanatemethyl)cyclohexane, 1,4-bis(isocyanatemethyl)cyclohexane, isophorone diisocyanate (IPDI), norbornane diisocyanate, dicyclohexylmethane diisocyanate, hydrogenated diphenylmethane diisocyanate, hydrogenated xylylene diisocyanate, and norbornene diisocyanate;

aromatic diisocyanates such as m-phenylene diisocyanate, p-phenylene diisocyanate, 2,4-tolylene diisocyanate (TDI), 2,6-tolylenediisocyanate (TDI), naphthylene-1,4-diisocyanate, naphthylene-1,5-diisocyanate, 4,4'-diphenyl diisocyanate, 4,4'-diphenyl methane diisocyanate (MDI), 2,4'-diphenyl methane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, 3,3'-dimethoxydiphenyl-4,4'-diisocyanate and dianisidine diisocyanate;

aromatic aliphatic diisocyanates such as 1,3-xylylene diisocyanate (XDI), 1,4-xylylene diisocyanate (XDI), ω,ω'-diisocyanate-1,4-diethyl benzene, 1,3-bis(1-isocynate-1-methylethyl) benzene, 1,4-bis(1-isocyanate-1-methylethyl) benzene, 1,3-bis(α,α-dimethylisocyanatemethyl) benzene, and tetramethylene xylylene diisocyanate; and derivatives obtained from these isocyanate group-containing compounds by allohalonation, burette conversion, dimerization (uretidione), trimerization (isocyanurate), adduct conversion, carbodiimide reaction etc., and mixtures thereof, and copolymers of these isocyanate group-containing compounds with the above-mentioned copolymerizable monomers.

In the present invention, the aliphatic diisocyanate is particularly preferably used, and particularly HMDI and derivatives thereof are preferably used.

[C] Carboxyl Group-Containing Compound

The carboxyl group-containing compound includes, for example, polyvalent carboxylic acids and carboxyl group-containing monomers that are constituents of the above polyester polyols, and polymers produced by homopolymerization or copolymerization of the carboxyl group-containing monomers, or copolymers having another copolymerizable monomer copolymerized therewith.

Another copolymerizable monomer constituting the carboxyl group-containing compound includes the above-mentioned hydroxyl group-containing monomer, amino group-containing monomer, epoxy group-containing monomer, amido group-containing monomer, alkoxysilyl group-containing monomer, hydrolysable silyl group-containing monomer, nitrile group-containing monomer, methylol group-containing monomer, oxazoline group-containing monomer, acrylate-based monomer, vinylidene halide-based monomer, aromatic vinyl monomer, and other monomers.

[D] Epoxy Group-Containing Compound

As the epoxy group-containing compound, for example, epi-bis type bisphenol A type epoxy compounds obtained by condensation reaction of bisphenol A with epichlorohydrin etc., bisphenol F type epoxy compounds, bisphenol AD type epoxy compounds, and bisphenol S type epoxy compounds are generally used and can be exemplified by hydrogenated epoxy compounds thereof, 3,4-epoxyvinyl cyclohexane, vinylcyclohexene monoepoxide alicyclic epoxy compounds, phenol novolak type epoxy compounds, bisphenol A novolak type epoxy compounds, cresol novolak type epoxy compounds, diaminodiphenylmethane type epoxy compounds, β-methylepichlo type epoxy compounds, glycidyl ether type epoxy compounds such as n-butyl glycidyl ether, allyl glycidyl ether, 2-ethyl hexyl glycidyl ether, phenyl glycidyl ether, and cresyl glycidyl ether, diglycidyl ether type epoxy compounds such as diglycidyl ether, glycidyl ester type epoxy compounds such as glycidyl(meth)acrylate, 3,4-epoxycyclohexyl (meth)acrylate, ε-caprolactone-modified glycidyl (meth)acrylate, and β-methylglycidyl(meth)acrylate, polyglycol ether type epoxy compounds, glycol ether type epoxy compounds, urethane bond-containing urethane modified epoxy compounds, amine modified epoxy compounds, fluorinated epoxy compounds, rubber modified epoxy compounds containing polybutadiene or acrylonitrile-butadiene copolymer rubber, flame-retardant epoxy compounds such as tetrabromobisphenol A glycidyl ether, and epoxy group-containing silicon compounds such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane.

Although the epoxy equivalent of the epoxy group-containing compound is not particularly limited, but epoxy group-containing compounds having an epoxy equivalent of 100 g/eq to 400 g/eq (preferably 150 g/eq to 350 g/eq) are preferable and can be used alone or as a mixture of two or more thereof.

In the present invention, an epoxy group-containing compound having an epoxy equivalent of 100 g/eq to less than 250 g/eq (preferably 120 g/eq to 230 g/eq, more preferably 150 g/eq to 200 g/eq) and an epoxy group-containing compound having an epoxy equivalent of 250 g/eq to 400 g/eq (preferably 280 g/eq to 350 g/eq) are preferably simultaneously used. By incorporation of two or more of kinds of such epoxy group-containing compounds, excellent curing properties and flexibility can be simultaneously achieved. Further, compatibility with the component (a) can be regulated.

Preferably the epoxy resin in the present invention has two or more epoxy groups in one molecule. By having two or more epoxy groups, curing properties and reaction rate can be improved. The crosslink density can be increased thereby increasing the strength of the resulting heat-storage object.

[E] Amino Group-Containing Compound

The amino group-containing compound includes:

aliphatic amino group-containing compounds such as ethylene diamine, diethylene triamine, triethylene tetramine, tetramethylene pentamine, diethylaminopropylamine, hexamethylene diamine, methylpentamethylene diamine, trimethyl hexamethylene diamine, guanidine and oleyl amine;

alicyclic amino group-containing compounds such as menthene diamine, isophorone diamine, norbornane diamine, piperidine, N,N'-dimethylpiperazine, N-aminoethylpiperazine, 1,2-diaminocyclohexane, bis(4-amino-3-methylcyclohexyl) methane, bis(4-aminocyclohexyl) methane, polycyclohexyl polyamine and DBU;

aromatic amino group-containing compounds such as methaphenilene diamine, 4,4'-diaminodiphenyl methane, and 4,4'-diaminodiphenyl sulfone;

aliphatic aromatic amino group-containing compounds such as m-xylylene diamine, benzyl dimethyl amine, 2-(dimethylaminomethyl) phenol, and 2,4,6-tris(dimethylaminomethyl) phenol;

amino group-containing compounds such as 3,9-bis(3-aminopropyl)-2,4,8,10-tetraoxaspiro[5,5]undecane (ATU), morpholine, N-methyl morpholine, polyoxypropylene diamine, polyoxypropylene triamine, and polyoxyethylene diamine;

hydroxyl group- and amino group-containing compounds such as diethanolamine and triethanolamine;

polyamide amines such as those of a polyamide obtained by reacting a dimer acid with a polyamine such as diethylene triamineortriethylene tetramine, and those of a polyamide using a polycarboxylic acid other than a dimer acid;

imidazoles such as 2-ethyl-4-methyl imidazole;

polyoxypropylene amines such as polyoxypropylene diamine and polyoxypropylene triamine; and epoxy-modified amines obtained by reacting epoxy compounds with the above amines, Mannich modified amines obtained by reacting formalin or phenol with the above amines, and modified amines such as Michael addition modified amines, ketimine, and aldimine; and amine salts such as 2,4,6-tris(dimethylaminomethyl) phenol 2-ethylhexanoate.

[F] Polycarboxylic Anhydrides

The polycarboxylic anhydrides can be exemplified by acid anhydrides such as tetrahydrophthalic anhydride, methyltetrahydrophthalic anhydride, methylnadic anhydride, hexahydrophthalic anhydride, and dodecylsuccinic anhydride.

The combination of the component (c-1) and component (c-2) in the present invention is preferably a combination of a hydroxyl group-containing compound and an isocyanate group-containing compound or a combination of an epoxy group-containing compound and an amino group-containing compound, particularly preferably a combination of a hydroxyl group-containing compound and an isocyanate group-containing compound. Such combination is preferable because the crosslinking reaction proceeds under mild conditions, and the crosslink density etc. can also be easily regulated.

The mixing ratio of the component (c-1) to the component (c-2) is not particularly limited and can be suitably established depending on applications. For example, when a hydroxyl group-containing compound and an isocyanate group-containing compound are used, their mixing ratio is established to attain the NCO/OH ratio usually in the range of 0.5 to 1.8, preferably 0.7 to 1.5. Given the NCO/OH ratio in such range, the heat-storage object can be made tough to attain a uniform and dense crosslinked structure without leakage of the heat-storage material.

When the NCO/OH ratio is lower than 0.5, the resulting heat-storage object has a lower degree of crosslink, may fail to attain sufficient physical properties in respect of curing properties, durability, strength etc., and allows easy leakage of the heat-storage material. When the NCO/OH ratio is higher than 1.8, there remains an unreacted isocyanate, with which various physical properties of the heat-storage object are adversely affected thus allowing easy deformation of the heat-storage object and easy leakage of the heat-storage material.

In the reaction of the component (c-1) with the component (c-2), a reaction accelerator can be used to advance the curing reaction rapidly.

The reaction accelerator for the reaction of a hydroxyl group-containing compound with an isocyanate group-containing compound includes, for example:

tertiary amines such as triethylamine, triethylenediamine, triethylamine, tetramethylbutanediamine, dimethylaminoethanol, dimer diamine, and dimer acid polyamide amine;

tin carboxylates such as dibutyltin dilaurate, dibutyltin diacetate, and tin octoate;

metal carboxylates such as iron naphthenate, cobalt naphthenate, manganese naphthenate, zinc naphthenate, iron octylate, cobalt octylate, manganese octylate, and zinc octylate;

carboxylates such as dibutyltin thiocarboxylate, dioctyltin thiocarboxylate, tributyl methyl ammonium acetate, and trioctyl methyl ammonium acetate;

aluminum compounds such as aluminum trisacetyl acetate.

These reaction accelerators may be used alone or as a mixture of two or more thereof.

The reaction accelerator is mixed in an amount of usually 0.01 to 10 parts by weight, preferably 0.05 to 5 parts by weight, based on 100 parts by weight (solid content) of the hydroxyl group-containing compound. When the reaction accelerator is less than 0.01 part by weight, curing properties and strength may be insufficient. When the amount is greater than 10 parts by weight, durability, resistance to discoloration, etc. may be deteriorated.

The process for producing the heat-storage object according to the present invention comprises mixing the component (a), the components added if necessary such as the component (d) and the component (e), the component (b), the component (c-1) and the component (c-2), and reacting the component (c-1) with the component (c-2) to form the binder (c). The process for producing the heat-storage object according to the present invention is characterized by using the component (b) in order to produce the heat-storage object wherein the component (a) is dispersed in fine colloidal state in the component (c-1) and/or the component (c-2).

A specific process for producing the heat-storage object of the present invention includes, for example:

<1> a process which comprises mixing the component (a), the component (b), the component (c-1), and the component (c-2) to form a reactive curable composition, and reacting the component (c-1) with the component (c-2), and <2> a process which comprises previously mixing the component (a), the component (b), and the component (c-1) having reactive functional group to form a mixture (composition for heat-storage object formation), then adding the component (c-2) having second reactive functional group to the mixture to form the reactive curable composition, and reacting the reactive curable composition.

The process for producing the heat-storage object of the present invention is characterized in that the component (a) before the reaction is dispersed in such colloidal state as to have particle diameter of about 10 µm to 1000 µm, preferably about 50 µm to 900 µm, more preferably about 100 µm to 800 µm, still more preferably about 150 to 700 µm. In this state, the components (c-1) and (c-2) are allowed to react with each other to form the binder (c), thereby giving a heat-storage object wherein the component (a) is dispersed in the form of fine particles in the binder (c).

The content of the heat-storage material in the heat-storage object of the present invention, though being suitably established depending on the form of use, is preferably 40 wt % or more, more preferably 50 wt % or more, still more preferably 60 wt % or more, most preferably 65 wt % or more. When the content of the heat-storage material is less than 40 wt %, heat-storage property may be insufficient.

Particularly in the state of the reactive curable composition before the reaction, the temperature in the system is preferably not lower than the melting point of the component (a). Specifically, the temperature in the system is usually about 20 to 80° C., and given such temperatures, a colloidal dispersion of the component (a) can be easily formed. The particle diameter of the component (a) dispersed in colloidal state is a value measured with optical microscope BHT-364M (manufactured by Olympus Corporation).

In a preferable embodiment, the reaction accelerator is added and/or energy such as heat, light or the like is applied in order to promote the reaction of the component (c-1) with the component (c-2). Particularly, the reaction temperature of the reactive curable composition is preferably not lower than the melting point of the component (a). Specifically, the reaction temperature is preferably about 20 to 80° C. though varying depending on the type of the component (a). At reaction temperatures not lower than the melting point of the component (a), the component (a) easily becomes colloidal, thus forming an excellent heat-storage object. The reaction time is usually 0.1 to 5 hours.

In the composition for heat-storage object formation the heat-storage object, and the process for producing the same according to the present invention, it is possible to add not only the components described above, but also additives such as a pigment, aggregate, a plasticizer, a preservative, a fungicide, a weedicide, a defoaming agent, a foaming agent, a leveling agent, a pigment dispersant, an antisettling agent, an anti-sagging agent, a lubricant, a dehydrating agent, a delustering agent, a flame retardant, an ultraviolet absorber, and a light stabilizer.

By mixing a flame retardant (also referred to hereinafter as "component (g)") with the heat-storage object of the present invention, the heat-storage material can be endowed with flame retardancy. The component (g) includes, for example, phosphorus compounds, organic phosphorus compounds, metal compounds and expandable graphite.

The phosphorus compound includes, for example, amine phosphates, red phosphorus and phosphates, such as phosphorus trichloride, phosphorus pentachloride, ammonium polyphosphate, amido-modified ammonium polyphosphate, melamine phosphate, melamine polyphosphate, guanidine phosphate, ethylenediamine phosphate, zinc ethylenediamine phosphate, and 1,4-butanediamine phosphate.

The organic phosphorus compound includes, for example, tricresyl phosphate, diphenyl cresyl phosphate, diphenyl octyl phosphate, tri(β-chloroethyl) phosphate, tributyl phosphate, tri(dichloropropyl) phosphate, triphenyl phosphate, tri(dibromopropyl) phosphate, chlorophosphate, bromophosphonate, diethyl-N,N-bis(2-hydroxyethyl) aminomethyl phosphate, and di(polyoxyethylene) hydroxymethyl phosphonate.

The metal compound includes, for example, magnesium hydroxide, aluminum hydroxide, calcium hydroxide, zinc hydroxystannate, zinc stannate, nickel oxide, cobalt oxide, iron oxide, copper oxide, molybdenum oxide, tin oxide, zinc oxide, silicon oxide, zeolite, zinc borate, soda borate, zirconium oxide, antimony trioxide, and antimony pentoxide.

Expandable graphite includes, for example, powders obtained by treating naturally occurring flaky graphite, pyrolysis graphite or cash graphite with sulfuric acid, nitric acid, acetic acid, perchloric acid, perchlorate, or permanganate.

Among the flame retardants described above, expandable graphite is particularly preferably used. The expandable graphite is preferably the one having expansion temperature not higher than the ignition point of the latent heat-storage material. The expansion temperature is preferably 180° C. or less, more preferably 170° C. or less, still more preferably 160° C. or less. When the expandable graphite having such expansion temperature is used, the expandable graphite is expanded at a temperature not higher than the ignition point of the latent heat-storage material to form surface carbonization layer (heat insulating layer) thereby preventing ignition of the latent heat-storage material. Such expandable graphite is preferably graphite obtained by treating naturally occurring flaky graphite with an organic acid such as acetic acid so that the organic acid is inserted into between layers of the naturally occurring graphite. It is particularly preferable that the expandable graphite has particle diameter of 150 to 500 μm and expansion volume of 150 to 300 ml/g.

The mixing ratio of the component (g) to the component (a) is 5 to 100 parts by weight, preferably 10 to 50 parts by weight of the component (g), based on 100 parts by weight of the component (a). When the component (g) is less than 5 parts by weight, flame retardancy is hardly increased, while when the component (g) is higher than 100 parts by weight, heat-storage property may be lowered.

The heat-storage object obtained by the producing process of the present invention may be in the form of a sheet, bar, needle, sphere, horn, or powder, and its shape is not particularly limited. The thickness of the heat-storage object in the form of a sheet is suitably established and is preferably 1 to 100 mm.

<Heat-Storage Structure>

First preferable mode of the heat-storage structure of the present invention is characterized in that the heat-storage object is formed into a sheet, at least one side of which is laminated with a laminating material. Second preferable mode is characterized in that the heat-storage object is covered with a laminating material. More preferable embodiments of the first heat-storage structure can be exemplified by:

(1) a structure laminated with a laminating material, wherein the laminating material is a heat conductor, preferably a heat conductor having heat conductivity of 0.1 W/(m·K) or more;

(2) a structure wherein the laminating material is a heat insulator having a heat conductivity of less than 0.1 W/(m·K);

(3) a structure further comprising a heating element laminated thereon; and (4) a clothing using at least a textile material as the laminating material.

[Heat-Storage Structure 1]

A preferable embodiment of the heat-storage structure of the present invention comprises a sheet-like heat-storage object laminated with a laminating material such as wooden plate, metal plate, resin plate, glass plate or inorganic plate, wherein the laminating material is preferably a heat conductor having heat conductivity of 0.1 W/(m·K) or more. The heat-storage structure of the present invention includes (i) a panel or sheet comprising a laminating material laminated on a heat-storage object, and (ii) a laminate comprising a heat-storage object laminated on the surface of a laminating material, wherein the laminating material is a structural base for a building or a structure, and the panel or sheet (i) is used by fixation by lamination on wall surface, floor, window etc. of a building or a structure, and preferably the surface of the laminate (ii) is further laminated with a laminating material.

The laminating material that is a heat conductor having heat conductivity of 0.1 W/(m·K) or more is not particularly limited, and specific examples include materials in the form of a sheet, film or panel, specifically a glass plate, a resin plate or sheet (including film) such as acrylic resin, vinyl resin and PET resin, a metal plate or metal foil such as stainless steel, copper, aluminum, iron, brass, zinc, magnesium and nickel, textile materials such as nonwoven fabric, fabric cloth, and glass cloth, paper materials such as paper and artificial paper, woody materials such as wood, particle board, and plywood, inorganic plates such as corrugated wall, plasterboard, ALC plate, calcium silicate plate, wood wool cement board, ceramic paper, natural stone slab, and inorganic siding board, and metal material-containing composite board or sheet such as metal siding board. The thickness of such heat conductor is preferably about 0.05 to 20 mm, more preferably about 0.1 to 15 mm. The heat-storage structure of the present invention is used mainly in an architectural structure, and thus a flame-retardant or nonflammable material is preferably used as the laminating material.

The heat-storage object in the heat-storage structure of the present invention is preferably in the form of a sheet. The process for producing the heat-storage structure is not particularly limited, and processes known in the art can be used. In the case of the laminate in (i) above, mention can be made of a process wherein for example, a heat-storage object is previously prepared and then bonded with a known adhesive, a pressure-sensitive adhesive tape or the like to one side or both sides of a heat conductor, or a process wherein a reactive curable composition containing the component (a) is directly laminated in the form of a sheet on one side or both sides of a heat conductor and then cured to form a heat-storage object.

In the case of the heat-storage structure in (ii) above, the reactive curable composition containing the component (a), is directly laminated in the form of a sheet on the surface of a structural base material for a building or construction, and if necessary the above laminating material (heat conductor) is laminated thereon, bonded and simultaneously cured, or after formation of the heat-storage object, is stuck thereto and laminated via an adhesive or the like.

The thickness of the sheet-like heat-storage object in the heat-storage structure is not particularly limited, but usually the thickness is preferably about 1 to 30 mm, more preferably about 2 to 20 mm.

The process of forming the sheet-like heat-storage object is not particularly limited, and the heat-storage object can be formed by extrusion molding, mold molding etc. or by coating onto various laminating materials by known processes such as spray coating, roller coating, brush coating, trowel coating, and casting.

In the case of the process of forming the heat-storage object by laminating and curing the reactive curable composition containing the component (a), the heat-storage object can be formed by laminating the heat reactive curable composition onto a heat conductor by known processes such as spray coating, roller coating, brush coating, trowel coating, and casting. The composition may be laminated directly on a heat conductor or the surface of a structural base material on site.

The heat-storage structure of the present invention is not particularly limited insofar as the heat conductor is laminated with the heat-storage object, and the heat-storage structure may be composed of 2 layers or 3 layers or more. Examples of the 3-layer structure include a 3-layer structure such as heat conductor/heat-storage object/heat conductor, heat-storage object/heat conductor/heat-storage object, or the like.

The heat-storage structure of the present invention may further be laminated with a protective layer. The protective layer may be laminated on the heat conductor or on the heat-storage object, and is preferably laminated particularly on the heat-storage object. By laminating such protective layer, the weatherability and durability of the heat-storage structure can be improved.

A material constituting the protective layer laminated on the heat-storage structure includes fiber sheets and sheets prepared by applying or sticking a coating liquid or a coating film of resin such as solution type, NAD type, aqueous solution type, water dispersion type or solventless type. The resin includes acrylic resin, silicon resin, polyester resin, alkyd resin, epoxy resin, urethane resin, phenol resin, melamine resin, amino resin, polycarbonate resin, fluorine resin, vinyl acetate resin, acrylic vinyl acetate resin, acrylic urethane resin, acrylic silicon resin, silicon modified acrylic resin, ethylene/vinyl acetate/veova resin, ethylene/vinyl acetate resin, vinyl chloride resin, ABS resin and AS resin.

If necessary the heat-storage structure of the present invention can be further laminated with a heat insulator. The position of the heat-storage structure on which the heat insulator is laminated is not particularly limited, and generally the heat insulator in a panel form is positioned at the side of a structural base in an architectural structure or a construction.

The heat insulator is not particularly limited, and preferably has thermal insulation properties with a heat conductivity of less than 0.1 W/(m·K) (more preferably 0.08 W/(m·K) or less, more preferably 0.05 W/(m·K) or less). The heat insulator having heat conductivity of less than 0.1 W/(m·K) has excellent insulating properties. As the heat insulator, it is possible to use the above-mentioned heat insulator, a commercial heat insulator, an air layer, a vacuum layer and the like.

The heat insulator having heat conductivity of less than 0.1 W/(m·K) includes, for example, polystyrene foam, polyurethane foam such as rigid polyurethane foam, acrylic resin foam, phenol resin foam, polyethylene resin foam, foamed rubber, glass wool, rock wool, foamed ceramics, or composites thereof.

The heat-storage structure of the present invention can be used for applications such as, for example, window glass, floors, walls and ceilings in residences and offices, greenhouses, and other heat retaining facilities.

For example, when used in plate glass for housings and offices or in greenhouses, the heat conductor having heat conductivity of 0.1 W/(m·K) or more, and the heat-storage object, preferably have transparency. Specifically, the light transmission thereof is preferably 70% or more, more preferably 80% or more. A constituent material of such heat conductor includes a glass plate, a resin board and a resin sheet. The light transmission is a value of whole light transmittance determined by an integrating sphere light transmittance measuring instrument (manufactured by for example Shimadzu Corporation), according to Measurement Method A prescribed in JIS K 7105-1981 5.5 "Light Transmittance and Whole Light Reflectance".

The heat-storage structure of the present invention has transparency in a preferable aspect, and may be a laminate of heat conductors not having transparency.

[Heat-Storage Structure 2]

A preferable embodiment of the heat-storage structure of the present invention comprises a sheet-like heat-storage object laminated with a heat insulator having a heat conductivity of less than 0.1 W/(m·K) as a laminating material.

Such heat-storage structure can be produced by a process wherein the heat-storage object obtained by the producing process described above is bonded to a heat insulator with a known adhesive or a pressure-sensitive adhesive tape or by a process wherein the reactive curable composition forming the heat-storage object is applied directly onto a heat insulator and cured by reaction. In the latter case, the heat-storage structure can be formed by applying the reactive curable composition forming the heat-storage object onto a panel-shaped heat insulator by known processes such as spray coating, roller coating, brush coating, trowel coating, and casting.

The above heat-storage structure is in the form of a panel or sheet, and may consist of 2 layers of the heat-storage object/heat insulator, or may be a 3-layer structure such as the heat insulator/heat-storage object/heat insulator or the heat-storage object/heat insulator/heat-storage object, or a 4-layer or more multilayer structure. One or more kinds of heat insulators or heat-storage objects may be used. A 3-layer or more multilayer structure can also be produced by lamination by the same lamination process as described above.

Although the heat insulator is not particularly limited, the heat insulator illustrated above in the heat-storage structure 1 can be used.

The shape of the heat-storage object in the heat-storage structure is not particularly limited, but is preferably in the form of a sheet. The thickness of the heat-storage heat insulator in the form of a sheet may be suitably established depending on applications, wherein each heat-storage object may be usually about 1 to 30 mm (preferably 2 to 20 mm) and each heat insulator may be usually about 1 to 30 mm (preferably 2 to 20 mm).

Particularly the heat-storage structure has preferably flexibility and can be formed by laminating suitably selected flexible heat-storage objects and flexible heat insulators. By having flexibility, the heat-storage structure can be laminated with no gap even in a curved site or an uneven site, is excellent in air-tightness, and can improve heat-storage/heat insulation property.

The heat-storage structure of the present invention can be preferably used mainly as interior materials and exterior materials such as inner wall materials, outer wall materials, ceiling materials and floor materials of architectural structures such as housings and interior materials of vehicles. The heat-storage structure 2 of the present invention can also be applied to a thermoelectric conversion system, a refrigerator/freezer, a cooler box, a thermal insulating sheet, electric appliances, daily necessaries for office automation equipments, industrial products such as machines and instruments, plants, tanks and the like. The heat-storage structure can also be used by sticking it onto various laminating materials.

In the heat-storage structure of the present invention, the heat-storage material can be suitably established depending on the intended use. For example, when the heat-storage structure is used as interior/exterior material of an architectural structure, the melting point of the latent heat-storage material used is preferably about 15 to 30° C. When it is used as an interior material of vehicles, the melting point of the latent heat-storage material is about 15° C. to 30° C., when used in a refrigerator, the melting point of the latent heat-storage material is about −10° C. to 5° C., or when used in a freezer, the melting point of the latent heat-storage material is −30° C. to −10° C.

The heat-storage structure having the heat-storage object of the present invention laminated therein, when applied to an architectural structure or a construction, may be used as a structure laminated with a panel, sheet or board used as a building material selected from the above-mentioned laminating materials, and for direct application, a heat insulator may be fixed on the surface of previously formed concrete, mortar or the like, followed by lamination thereof with the reactive curable composition and subsequent curing by reaction.

The heat-storage structure 2 laminated with the heat-storage object of the present invention may be constituted such that the surface of the laminating material is contacted with the heat insulator or the surface of the laminating material is contacted with the heat-storage object. In the present invention, the heat-storage structure is laminated preferably such that the heat insulator is placed in the outside and the heat-storage object is placed in the inside. By laminating the heat-storage structure in this way, excellent heat-storage/heat insulation property can be achieved, and a change in temperature in space can be preferably relaxed.

The process of lamination includes a process of attachment via an adhesive or a pressure-sensitive adhesive tape known in the art or a process of fixation by nailing or the like. Depending on the intended use, the heat-storage object can be easily laminated by cutting in an adjusted size with a cutter.

In the present invention, the component (a) does not leak even by fixation by nailing or cutting with a cutter or the like. Accordingly, the heat-storage structure can have excellent heat-storage/heat insulating properties and can maintain a comfortable environment with less fluctuation in space temperature against a change in outside air temperature and can achieve efficient energy saving.

When the laminating material itself is a heat insulator having heat insulation property, the effect of the present invention can also be achieved by lamination by a process of attaching only the heat-storage object to the laminating material via an adhesive or a pressure-sensitive adhesive tape known in the art or by fixation by nailing or the like.

In the present invention, a heat conductor having a heat conductivity of 10.0 W/(m·K) or more (preferably 20.0 W/(m·K) or more, more preferably 100 W/(m·K) or more) is preferably laminated on the surface of the heat-storage object. Lamination of the heat conductor is preferable because the speed of heat transfer is increased and the heat efficiency of the heat-storage object is improved. A material having heat conductivity of 10.0 W/(m·K) or more includes metal plates consisting of a metal material such as copper, aluminum, iron, brass, zinc, magnesium and nickel, or a coating film or a sheet containing such metal material. In the present invention, an aluminum plate can be particularly preferably used.

The thickness of such heat conductor is not particularly limited, and is usually preferably about 5 to 1000 μm. The heat conductivity in the present invention is a value measured with a thermal conductivity meter (Kemtherm. QTM-D3 (trade name) manufactured by Kyoto Denshi Kogyo Co., Ltd.).

The heat-storage structure laminated with the heat-storage object of the present invention may further be provided with a surface material on the surface of the heat-storage structure.

As the surface material, it is possible to use inorganic boards such as a calcium silicate board and plasterboard, woody materials such as pine, lauan, beech, Japanese cypress, and plywood, coating materials, sheet materials, and wallpaper, and a laminate of one or more of these materials can be used.

The coating material is not particularly limited insofar as it is a material used usually in coating in an architectural structure, and materials prescribed in JIS K 5663 "Synthetic Resin Emulsion Paint" etc. can be preferably used. The thickness of a dry film of the coating material is not particularly limited, but is preferably 200 μm or less.

[Heat-Storage Structure 3]

A preferable embodiment of the heat-storage structure of the present invention is a structure comprising a sheet-like heat-storage object laminated with a laminating material and a heating element, preferably a sheet heating element. The heat-storage structure is particularly suitable for a floor heating structure.

As the sheet heating element, a known sheet heating element can be used without particular limitation. The sheet heating element includes, for example, an element having a nichrom wire arranged meanderingly on the surface of an insulating material, an element having an electrical resistance heating element laminated on an electrode, a PTC sheet heating element, and the like. In the present invention, an element having an electrical resistance heating element laminated on electrode, and a PTC sheet heating element, can be preferably used.

The electrical resistance of the electrical resistance heating element is preferably $1 \times 10^3$ Ω·cm or less, more preferably $1 \times 10^2$ Ω·cm or less. The electrical resistance heating element is preferably composed of a resin component and electroconductive powder. It is not preferable that the electrical resistance of the electrical resistance heating element is greater than $1 \times 10^3$ Ω·cm, because power consumption is increased.

The resin component constituting the electrical resistance heating element includes acrylic resin, polyester resin, acrylic silicon resin, silicon resin, urethane resin, epoxy resin, polyvinyl alcohol resin, butyral resin, amino resin, phenol resin, fluorine resin, synthetic rubber, or a composite resin thereof. Among them, urethane resin, epoxy resin, acrylic resin, silicon resin, phenol resin and synthetic rubber for example are preferably used as flexible resin.

As the electroconductive powder constituting the electrical resistance heating element, it is possible to use carbon powder such as graphite powder, squamous graphite, flaky graphite, and carbon nanotube, carbon fibers such as fibers converted into graphite and fibers having graphite supported thereon, metallic fine particles such as those of silver, gold, copper, nickel, aluminum, zinc, platinum, palladium or iron, electroconductive fibers having electroconductive components such these metallic fine particles supported on the surfaces of fibers, electroconductive powder having metallic fine particles supported on the surface of powder of mica, isinglass, talc, titanium oxide or the like, and electroconductive oxides such as fluorine-doped tin oxide, tin-doped indium oxide, antimony-doped tin oxide, and electroconductive zinc oxide.

The electrical resistance heating element can be produced by mixing the electroconductive powder uniformly in the resin and forming the resulting mixture into a film or sheet by a process known in the art. Although the amount of the electroconductive powder mixed is not particularly limited, the electroconductive powder may be mixed such that the electrical resistance of the electrical resistance heating element can be regulated at $1 \times 10^3$ $\Omega \cdot cm$ or less, and the amount of the electroconductive powder mixed is preferably 10 to 300 parts by weight, more preferably 30 to 100 parts by weight, based on 100 parts by weight of the solid content of the resin component.

In addition to the resin component described above, additives such as a defoaming agent, a thickening agent, a preservative, an antibacterial agent, a denaturant, an ultraviolet absorber, a curing agent, a curing catalyst, a film-thickening additive and a solvent can be added to the electrical resistance heating element in such a range that the electrical resistance can be regulated at $1 \times 10^3$ $\Omega \cdot cm$ or less.

The thickness of the electrical resistance heating element is preferably 3 mm or less. When the thickness is greater than 3 mm, flexibility is reduced, and the temperature of the electrical resistance heating element easily becomes uneven, thus making uniform temperature hardly achievable in some cases.

An electrode of the electrical resistance heating element is not particularly limited insofar as its electrical resistance is lower than that of the electrical resistance heating element, and preferably an electrode consisting of metallic fine particles and/or a paste mixed with metallic fine particles can be used. Although the metallic fine particles are not particularly limited, silver, copper, gold, platinum etc. can be used. The electrode can be laminated on the electrical resistance heating element by processes known in the art. For example, the electrode can be laminated by spraying, rolling, brush coating, dip coating, sputtering, vapor deposition, screen printing, doctor blade method or the like.

A PTC sheet heating element is an element utilizing PTC (positive temperature coefficient) characteristics and can be formed by printing a special heating ink having PTC characteristics on a resin film such as polyester film, PET film or the like. As a material of the special heating ink, use is made of semiconductor barium titanate ceramics doped with a very small amount of rare earth elements such as yttrium, antimony and lanthanum.

The temperature of the PTC sheet heating element upon electrification is rapidly increased due to PTC characteristics, to reach a predetermined temperature, and the PTC sheet heating element itself can control and maintain the temperature, and thus a sensor controller or the like may not be used.

Because of a printing system with the special heating ink, the PTC sheet heating element can be formed in a thin form, thus achieving weight saving and thinning. This PTC sheet heating element has low resistance until a predetermined temperature is reached after electrification, and the consumption power required for rising temperature can be reduced, and when a predetermined temperature is reached, the power consumption can be suppressed by self-control function, thus enabling efficient heating.

As a floor material that is the laminating material in the heat-storage structure of the present invention, it is possible to use resin tiles and resin sheets of vinyl chloride, polyolefin etc., woody materials such as solid timber, plywood, and particle board, fibrous materials, ceramics materials such as porcelain tile, natural stone materials such as marble, granite, and terrazzo, concrete materials such as mortar, and natural resin tile and natural resin sheet of rubber and linoleum. A tatami mat, a carpet, a rug, and flooring material can also be used as the floor material. In the present invention, particularly, a material having heat resistance is more preferable. The thickness of the floor material is usually about 1 to 20 mm, preferably about 2 to 15 mm.

The floor heating structure of the present invention can be used in a newly constructed house, a reformed house and the like. The process for forming the floor heating structure of the present invention is not particularly limited, and the heat-storage object, the sheet heating element and the floor material may be laminated with one another by processes known in the art.

The lamination process includes, for example, a process wherein a floor heating panel consisting of a heat-storage object, a sheet heating element and a floor material is previously prepared and then laminated on a structural base material (concrete, mortar etc.) or existing flooring and a process wherein a heat-storage object, a sheet heating element and a floor material are laminated on a structural base material or existing flooring.

Specific processes can include a process wherein a sheet heating element and a floor material are bonded in this order with a known adhesive, a pressure-sensitive tape or the like, to the heat-storage object obtained by the producing process described above, to prepare a floor heating panel which is then laminated with a known adhesive, a pressure-sensitive tape or the like, onto a laminating material or existing flooring, or a process wherein the reactive curable composition forming the heat-storage object described above is directly applied onto an existing base material or flooring, to form the heat-storage object, and then a sheet heating element and a floor material are laminated in this order thereon.

In the latter case, the heat-storage object can be formed by applying the reactive curable composition forming the heat-storage object onto a base material or existing flooring by known processes such as spray coating, roller coating, brush coating, trowel coating, and casting.

The thickness of the floor heating structure is not particularly limited, and is particularly 5 to 50 mm, preferably about 10 to 40 mm, in the present invention. By making it as thin as 5 to 50 mm and weight saving, the floor heating structure can be easily applied, and particularly in reforming, a comfortable living environment can be maintained after application without stress on the living environment.

Even if the floor heating structure of the present invention is as thin as 5 to 50 mm, it has excellent heat-storage property and can thus reduce power consumption and can maintain a comfortable living environment.

In the present invention, the heating structure can further be laminated with a heat insulator. By laminating the heat insulator, the outside temperature change can be relaxed, and simultaneously the heat generated by the sheet heating element is hardly lost to the outside, and the floor surface can be efficiently warmed.

The position on which the heat insulator is laminated is not particularly limited, but is preferably between a base material or existing flooring and the heat-storage object. The heat insulator may be newly laminated, or the previously existing heat insulator may be used. As the heat insulator, the heat insulator illustrated above in the heat-storage structure 1 can be used. Preferably the thickness of the heat insulator is usually 1 mm to 30 mm.

In the present invention, a heat conductor can also be laminated. The position on which the heat conductor is laminated is not particularly limited, but is preferably between the heat-storage object and the sheet heating element, or between the sheet heating element and the floor material. By laminating the heat conductor, the heat generated by the sheet heating element can easily transfer to the heat-storage object and the floor material thereby heating the floor surface efficiently.

The heat conductor includes metal plates consisting of a metal material such as copper, aluminum, iron, brass, zinc, magnesium and nickel, or a coating film and a sheet containing such metal material. In the present invention, an aluminum plate can be particularly preferably used.

[Heat-Storage Clothing]

Heat-storage clothing can be constituted by using the heat-storage object of the present invention and simultaneously using at least a fibrous material as a laminating material. Such heat-storage clothing is excellent in protection for human body and can reduce the influence of an external environment such as outside air temperature, even in a very cold area at freezing temperature or less such as the South Pole and Siberia or in a high-temperature environment such as the scene of a fire.

The heat-storage clothing comprises the heat-storage object of the present invention arranged between an outer material and a lining material, and can suppress the influence of an external environment such as outside air temperature.

An outer material is a portion exposed to the external environment, and the material is not particularly limited and may be a known material. The material used as the outer material includes, for example, natural fibers such as cotton, hemp, wool and silk, organic fibers such as nylon, Tetoron, acryl, polyester, polyurethane, Vinylon, rayon, aramid, and azole, inorganic fibers such as glass and asbestos, and fibers obtained by subjecting them to flame-retardant treatment/water-repellent treatment. A part of the laminating material may be a metal, a resin sheet, or rubber. The fiber materials may be used alone or as a composite of two or more thereof, or may be used in combination with a metal, a resin sheet, or rubber. The outer material can be endowed with functions such as heat resistance, waterproof property, air permeability, and durability.

As the lining material, a known lining material can also be used without particular limitation. As the material used as the lining material, the materials illustrated as the outer material can be used. The lining material may be endowed with functions such as heat resistance, waterproof property, air permeability, and water-absorbing property.

The heat-storage clothing of the present invention, even when pierced with a needle etc., does not permit the heat-storage material to be leaked from the heat-storage object, or even when cut with scissors etc., does not permit the heat-storage material to be leaked from the heat-storage object. Accordingly, the clothing can be easily prepared, and clothing excellent in functionality and design can be prepared. Design etc. are not particularly limited.

The structure of the heat-storage clothing is not particularly limited insofar as the heat-storage object is laminated between the outer material and the lining material, and the heat-storage object, the outer material and the lining material can be fixed with Magic Tape (registered trade name) (manufactured by Kuraray Co., Ltd.) etc. or fixed by sewing them together with a yarn. The heat-storage object of the present invention, even when pierced with a needle or cut with scissors etc., does not permit the heat-storage material to be leaked from the heat-storage object as described above, and thus the clothing can be easily prepared, and clothing excellent in functionality and design can be prepared. The clothing is provided with a zipper, pockets etc. by which the heat-storage object can be held and removed, and the phase change temperature (melting point) of the heat-storage material constituting the heat-storage object can be selected depending on the intended object.

In the heat-storage clothing described above, a heat insulator, a shock absorber, a hygroscopic material etc. in addition to the heat-storage object may be laminated between the outer material and the lining material. The heat insulator includes natural materials such as feather and wool, fiber materials such as acrylic fiber, and commercial heat insulators such as polystyrene foam, polyurethane foam, acrylic resin foam, phenol resin foam, polyethylene resin foam, foamed rubber, glass wool and foamed ceramics. These materials may be used as a composite thereof.

[Heat-Storage Structure 4]

A preferable embodiment of the heat-storage structure of the present invention is a structure comprising a heat-storage object covered with a laminating material. Such heat-storage structure can be formed in an arbitrary shape and can be used in a heat insulator for a warmer. A compound having a segment which is vibrated by microwaves to generate heat is used particularly as the binder (c) constituting the heat-storage object, whereby the heat-storage object can not only store heat such as waste heat but can also be heated to store heat by using irradiation with microwaves, for example with a household microwave oven.

The heat-storage structure described above is primarily intended to be heated for use, and the organic latent heat-storage material (a) is preferably a material having melting point of 0° C. or more, and specifically, among aliphatic hydrocarbons, particularly those having a melting point not lower than that of pentadecane (melting point 6° C.) are preferably used.

The segment generating heat by absorbing microwaves includes carboxyl group, hydroxyl group, amino group and carbonyl group, as well as an ether linkage, ester linkage, amide linkage and urethane linkage present in a skeleton constituting a molecular chain. Particularly, a segment having an ether linkage or the like in skeleton is preferable in the present invention.

By using the binder (c) containing the segment mentioned above, the heat-storage structure can be easily allowed to store heat by heating with microwaves in a microwave oven. Such binder (c) can be formed by using, as at least one component of the component (c-1) and/or the component (c-2), a compound having a segment which absorbs microwaves to generate heat. Microwaves causing the heat-storage structure to generate heat include, for example, electronic oven microwaves (2450 MHz) etc., and usually microwaves in the range of 300 MHz to 300 GHz can be used. When a household microwave oven is used, the heat-storage structure is irradiated with microwaves (frequency: 2450 MHz) for about 0.5 to 5 minutes, preferably about 1 to 3 minutes, the structure can easily store heat to an objective temperature.

The heat-storage structure is preferably used as a heat insulator. A laminating material (surface material) for holding the heat-storage object can be exemplified by a nonwoven fabric, a woven cloth, paper, synthetic paper, plastic film (PET film etc.) and the like. The heat-storage structure can be produced by using the above components by processes known in the art, such as extrusion molding, framework molding and the like. The process of covering the heat-storage material with the surface material can be exemplified for example by a process which involves producing the heat-storage object and then laminating it with the surface material and a process which involves forming the surface material into a bag and then injecting the reactive curable composition for forming the heat-storage object into the bag, followed by curing thereof.

The thickness of the sheet-like heat insulator in the heat-storage structure is not particularly limited, but is usually 1 to 30 mm, preferably about 2 to 20 mm.

The heat-storage structure can easily store and retain heat by using a household microwave oven, and can thus be applied to a heat insulator for warming in winter and can also be used in a heat insulator used for keeping foodstuffs warm, such as containers for home-delivered pizza and for box lunch, a heat insulator used in health-enhancing products. By combination with a heat insulator etc., the heat retaining effect can be further improved.

EXAMPLES

Hereinafter, the features of the present invention are made more evident by reference to the Examples and Comparative Examples, but the present invention is not limited to these examples.

Examples 1-1 to 1-7, Comparative Examples 1-1 to 1-4

Example 1-1

The starting materials shown in Table 1-1 were used, and the organic latent heat-storage material 1-A, the nonionic surfactant 1-A, the hydroxyl group-containing compound 1-A and the reaction accelerator in the compounding amounts shown in Table 1-2 were mixed at a temperature of 35° C. under stirring at 1000 rpm with a stirring blade, to disperse the organic latent heat-storage material 1-A in colloidal state (average particle diameter 180 pin). Further, the polyisocyanate 1-A was added, and the mixture was stirred and then poured into a mold of 250 mm×170 mm×5 mm, cured at 50° C. for 30 minutes and removed from the mold to give a sample. The resulting sample was examined by the following tests.

(Heat-Storage Material Leakage Evaluation Test)

The resulting sample was left in an atmosphere at 10° C. or 50° C. for 72 hours and then placed in an atmosphere at a temperature of 30° C. in 50% relative humidity and observed for the leakage of the heat-storage material from the sample. Evaluation is as follows. The results are shown in Table 1-3.
◎: Leakage was not observed.
○: Leakage was hardly observed.
x: Leakage was observed.
(Heat Storage Physical Property Test)

The phase change temperature (° C.) and latent heat quantity (kJ/kg) of the obtained sample were measured by differential scanning calorimetry (DSC) with DSC220CU (manufactured by Seiko Instruments Inc.). The sample was measured at a rising temperature of 10° C./min, in the temperature range of 20 to 60° C. with aluminum as a reference. The results are shown in Table 1-3.

(Processability Test)

The obtained sample was cut with a cutter knife in an atmosphere at a temperature of 30° C. in 50% relative humidity and observed for the leakage of the heat-storage material from the cut surface. Evaluation is as follows. The results are shown in Table 1-3.
◎: Leakage was not observed.
○: Leakage was hardly observed.
x: Leakage was observed.
(Applicability Test)

The obtained sample was nailed in an atmosphere at a temperature of 30° C. in 50% relative humidity and observed for the leakage of the heat-storage material by nailing. Evaluation is as follows. The results are shown in Table 1-3.
◎: Leakage was not observed.
○: Leakage was hardly observed.
x: Leakage was observed.

Example 1-2

The starting materials shown in Table 1-1 were used, and the organic latent heat-storage material 1-A, the nonionic surfactant 1-A, the organically treated layered clay mineral, the hydroxyl group-containing compound 1-A and the reaction accelerator in the compounding amounts shown in Table 1-2 were mixed at a temperature of 35° C. under stirring at 1000 rpm with a stirring blade, to disperse the organic latent heat-storage material 1-A in colloidal state (average particle diameter 420 μm). Further, the polyisocyanate 1-A was added, and the mixture was stirred and then poured into a mold of 250 mm×170 mm×5 mm, cured at 50° C. for 30 minutes and removed from the mold to give a sample. The resulting sample was tested in the same manner as in Example 1-1. The results are shown in Table 1-3.

Example 1-3

The starting materials shown in Table 1-1 were used, and the organic latent heat-storage material 1-B, the nonionic surfactant 1-B, the organically treated layered clay mineral, the hydroxyl group-containing compound 1-B and the reaction accelerator in the compounding amounts shown in Table 1-2 were mixed at temperature of 23° C. under stirring at 1000 rpm with a stirring blade, to disperse the organic latent heat-storage material 1-B in colloidal state (average particle diameter 500 μm). Further, the polyisocyanate 1-B was added, and the mixture was stirred and then poured into a mold of 250 mm×170 mm×5 mm, cured at 50° C. for 30 minutes and removed from the mold to give a sample. The resulting sample was tested in the same manner as in Example 1-1. The results are shown in Table 1-3.

Example 1-4

The starting materials shown in Table 1-1 were used, and the organic latent heat-storage material 1-A, the organic latent heat-storage material 1-B, the nonionic surfactant 1-A, the organically treated layered clay mineral, the hydroxyl group-containing compound 1-A and the reaction accelerator in the compounding amounts shown in Table 1-2 were mixed at a temperature of 35° C. under stirring at 1000 rpm with a stirring blade, to disperse the organic latent heat-storage materials 1-A and 1-B in a colloidal state (average particle diameter 480 μm). Further, the polyisocyanate 1-A was added, and the mixture was stirred and then poured into a mold of 250 mm×170 mm×5 mm, cured at 50° C. for 30 minutes and removed from the mold to give a sample. The resulting sample was tested in the same manner as in Example 1-1. The results are shown in Table 1-3.

Example 1-5

The starting materials shown in Table 1-1 were used, and the organic latent heat-storage material 1-A, the organic latent heat-storage material 1-B, the nonionic surfactant 1-A, the compatibilizing agent, the organically treated layered clay mineral, the hydroxyl group-containing compound 1-A and the reaction accelerator in the compounding amounts shown in Table 1-2 were mixed at temperature of 35° C. under stirring at 1000 rpm with a stirring blade, to disperse the organic latent heat-storage materials 1-A and 1-B in colloidal state (average particle diameter 600 μm). Further, the polyisocyanate 1-A was added, and the mixture was stirred and then poured into a mold of 250 mm×170 mm×5 mm, cured at 50° C. for 30 minutes and removed from the mold to give a sample. The resulting sample was tested in the same manner as in Example 1-1. The results are shown in Table 1-3.

Example 1-6

The starting materials shown in Table 1-1 were used, and the organic latent heat-storage material 1-A, the nonionic surfactant 1-B, the organically treated layered clay mineral, the hydroxyl group-containing compound 1-B and the reaction accelerator in the compounding amounts shown in Table 1-2 were mixed at temperature of 35° C. under stirring at 2000 rpm with a stirring blade, to disperse the organic latent heat-storage material 1-A in colloidal state (average particle diameter 200 μm). Further, the polyisocyanate 1-B was added, and the mixture was stirred and then poured into a mold of 250 mm×170 mm×5 mm, cured at 50° C. for 30 minutes and removed from the mold to give a sample. The resulting sample was tested in the same manner as in Example 1-1. The results are shown in Table 1-3.

Example 1-7

The starting materials shown in Table 1-1 were used, and the organic latent heat-storage material 1-A, the nonionic surfactant 1-B, the organically treated layered clay mineral, the hydroxyl group-containing compound 1-B and the reaction accelerator in the compounding amounts shown in Table 1-2 were mixed at temperature of 35° C. under stirring at 2000 rpm with a stirring blade, to disperse the organic latent heat-storage material 1-A in colloidal state (average particle diameter 180 μm). Further, the polyisocyanate 1-B was added, and the mixture was stirred and then poured into a mold of 250 mm×170 mm×5 mm, cured at 50° C. for 30 minutes and removed from the mold to give a sample. The resulting sample was tested in the same manner as in Example 1-1. The results are shown in Table 1-3.

Comparative Example 1-1

7 parts by weight of silica powder (oil absorption 350 g/100 g) were impregnated with 20 parts by weight of the organic latent heat-storage material 1-A shown in Table 1-1 to prepare paste. Thereafter, slurry prepared by mixing 27 parts by weight of the prepared paste, 35 parts by weight of water and 40 parts by weight of calcined gypsum was poured into a mold of 250 mm×170 mm×5 mm, dried at 50° C. for 12 hours and removed from the mold to give a sample. The resulting sample was tested in the same manner as in Example 1-1. The results are shown in Table 1-3.

Comparative Example 1-2

Slurry prepared by mixing 35 parts by weight of heat-storage material microcapsule aqueous dispersion (solid content, 50%; heat-storage material content, 40 wt %; capsule component, melamine resin) containing the organic latent heat-storage material 1-A shown in Table 1-1, 25 parts by weight of water and 40 parts by weight of calcined gypsum was poured into a mold of 250 mm×170 mm×5 mm, dried at 50° C. for 12 hours and removed from the mold to give a sample. The resulting sample was tested in the same manner as in Example 1-1. The results are shown in Table 1-4.

Comparative Example 1-3

The organic latent heat-storage material 1-A shown in Table 1-1 was laminated with a sheet of aluminum-deposited polyethylene terephthalate (250 mm×170 mm×5 mm) to give a sample. The resulting sample was tested in the same manner as in Example 1-1. The results are shown in Table 1-4. In the heat-storage physical property test, the sample could not be directly measured, and thus from the physical properties of the heat-storage material, the physical properties were determined on the basis of the heat conductivity and weight of the sheet.

Comparative Example 1-4

The organic latent heat-storage material 1-A shown in Table 1-1 was formed with gelatin into capsules (grain diameter 3 mm; heat-storage material content, 70%) which were then packed into a case of polyethylene terephthalate of 250 mm×170 mm×5 mm to give a sample. The resulting sample was tested in the same manner as in Example 1-1. The results are shown in Table 1-4. In the heat storage physical property test, the sample could not be directly measured, and thus from the physical properties of the heat-storage material, the physical properties were determined on the basis of the heat conductivity and weight of the gelatin coating and the case of polyethylene terephthalate.

TABLE 1-1

| | |
|---|---|
| Organic Latent Heat-Storage Material 1-A | Methyl palmitate (phase change temperature, 30.0° C.; latent heat quantity 210 kJ/kg) |
| Organic Latent Heat-Storage Material 1-B | Methyl myristate (phase change temperature, 19.0° C.; latent heat quantity 190 kJ/kg) |
| Nonionic Surfactant 1-A | Polyoxyethylene sorbitan monopalmitate (HLB = 15.6) |
| Nonionic Surfactant 1-B | Polyoxyethylene sorbitan monostearate (HLB = 14.9) |
| Compatibilizing Agent | Refined palm oil (fatty acid triglyceride, phase change temperature 20 to 23° C., latent heat quantity 116 kJ/kg) |
| Organically Treated Layered Clay Mineral | BENTONE 34 (manufactured by Elementis Japan K.K.) |
| Hydroxyl Group-Containing Compound 1-A | Solventless polyester polyol: polycondensate of 2,4-diethyl-1,5-pentamethylene diol and adipic acid; hydroxyl value 60 mg KOH/g, molecular weight 2000 |

TABLE 1-1-continued

| | |
|---|---|
| Hydroxyl Group-Containing Compound 1-B | Solventless polyether polyol: propylene oxide polymer of glycerin skeleton; hydroxyl value 40 mg KOH/g, molecular weight 4000 |
| Polyisocyanate 1-A | HMDI-based polyisocyanate (isocyanurate type): NCO % 16.0% (solid content 100%) |
| Polyisocyanate 1-B | HMDI-based polyisocyanate (isocyanurate type): NCO % 12.0% (solid content 100%) |
| Reaction Accelerator | Dibutyltin dilaurate |

TABLE 1-2

| | Example 1-1 | Example 1-2 | Example 1-3 | Example 1-4 | Example 1-5 | Example 1-6 | Example 1-7 |
|---|---|---|---|---|---|---|---|
| Organic Latent Heat-Storage Material 1-A | 70.0 | 65.0 | | 48.0 | 48.0 | 45.0 | 55.0 |
| Organic Latent Heat-Storage Material 1-B | | | 68.0 | 12.0 | 12.0 | | |
| Nonionic Surfactant 1-A | 3.0 | 3.0 | | 3.0 | 3.0 | | |
| Nonionic Surfactant 1-B | | | 4.0 | | | 3.0 | 3.0 |
| Compatibilizing Agent | | | | | 1.0 | | |
| Organically Treated Layered Clay Mineral | | 8.0 | 7.0 | 7.0 | 9.0 | 8.0 | 8.0 |
| Hydroxyl Group-Containing Compound 1-A | 20.7 | 19.0 | | 22.2 | 20.7 | | |
| Hydroxyl Group-Containing Compound 1-B | | | 16.4 | | | 34.8 | 26.8 |
| Polyisocyanate 1-A | 5.8 | 4.5 | | 6.3 | 5.8 | | |
| Polyisocyanate 1-B | | | 4.1 | | | 8.7 | 6.7 |
| Reaction Accelerator | 0.5 | 0.5 | 0.5 | 0.5 | 0.5 | 0.5 | 0.5 |

TABLE 1-3

| | Example 1-1 | Example 1-2 | Example 1-3 | Example 1-4 | Example 1-5 | Example 1-6 | Example 1-7 |
|---|---|---|---|---|---|---|---|
| Heat-Storage Material Leakage Evaluation | | | | | | | |
| In 10° C. Atmosphere | ◎ | ◎ | ◎ | ◎ | ◎ | ◎ | ◎ |
| In 50° C. Atmosphere | ◎ | ◎ | ◎ | ◎ | ◎ | ◎ | ◎ |
| Heat Storage Physical Properties | | | | | | | |
| Phase Change Temperature (° C.) | 27.1 | 26.4 | 18.4 | 23.1 | 21.8 | 26.0 | 26.2 |
| Latent Heat Quantity (kJ/kg) | 152.0 | 138.0 | 132.0 | 130.0 | 128.0 | 100.0 | 116.0 |
| Processability Test | ◎ | ◎ | ◎ | ◎ | ◎ | ◎ | ◎ |
| Applicability Test | ◎ | ◎ | ◎ | ◎ | ◎ | ◎ | ◎ |

TABLE 1-4

| | Comparative Example 1-1 | Comparative Example 1-2 | Comparative Example 1-3 | Comparative Example 1-4 |
|---|---|---|---|---|
| Heat-Storage Material Leakage Evaluation | | | | |
| In 10° C. Atmosphere | X | ○ | ◎ | ◎ |
| In 50° C. Atmosphere | X | X | ◎ | ◎ |

TABLE 1-4-continued

|  | Comparative Example 1-1 | Comparative Example 1-2 | Comparative Example 1-3 | Comparative Example 1-4 |
|---|---|---|---|---|
| Heat Storage Physical Properties |  |  |  |  |
| Phase Change Temperature (° C.) | 24.8 | 23.5 | 25.5 | 23.1 |
| Latent Heat Quantity (kJ/kg) | 60.6 | 38.4 | 164.0 | 102.4 |
| Processability Test | X | X | *1 | *1 |
| Applicability Test | X | X | *2 | *2 |

*1: Cutting with a cutter knife was difficult.
*2: Nailing was difficult.

Examples 2-1 to 2-5, Comparative Examples 2-1 to 2-2

Example 2-1

First, heat-storage object 2-1 was produced by the following process.

Heat-storage object 2-1: The starting materials shown in Table 2-1 were used, and a mixture of the heat-storage material 2-A and the surfactant, the hydroxyl group-containing compound and the isocyanate group-containing compound in the compounding amounts shown in Table 2-2 were mixed at a temperature of 40° C. under stirring at 1000 rpm with a stirring blade, to disperse the heat-storage material 2-A in colloidal state (average particle diameter 190 μm), then the reaction accelerator was added, and the mixture was sufficiently stirred. After stirring, the mixture was poured into a mold of 350 mm×350 mm×3 mm laid with a 50-μm polyethylene terephthalate film (PET film), cured at 50° C. for 18 minutes, removed from the mold to give heat-storage object 2-1 of 3 mm in thickness. The NCO/OH ratio was 1.0. The PET film surface of the resulting heat-storage object 2-1 was laminated via adhesive with a glass plate (375 mm×375 mm, heat conductivity 0.8 W/(m·K), thickness 3 mm) to give a sample.

(Heat Retaining Property Test)

As shown in FIG. 1, an acrylic plate 3 (thickness 5 mm) and polystyrene foam 4 (thickness 25 mm) were laminated with each other via adhesive, and the laminates thus obtained were used as the four sides and bottom of a sample box respectively and arranged such that the acrylic plate 3 was placed inside the box. The prepared sample was used as the upper face of the sample box and arranged such that the heat-storage object 2-1 (FIG. 1 the heat-storage object:1) was placed inside the box to prepare a sample box having inside dimensions of 350 mm×350 mm×350 mm.

For measuring the sample surface (heat-storage object 2-1 surface) temperature, the sample backside (glass surface) temperature and the space temperature (temperature in the box), thermocouples 5 were arranged in the center of the heat-storage object 2-1 surface, the glass 2 surface center, and the sample box center respectively as shown in FIG. 1. As the heat source, an infrared lamp 6 was used such that the upper face temperature of the sample box was made constant at 50° C.

In evaluation of heat-retaining property, the sample box was left in atmosphere at 25° C. for 24 hours and then irradiated with an infrared lamp 6, and 20 minutes and 60 minutes thereafter, the temperatures in each site was measured. The results are shown in Table 2-3.

After the heat-retaining property test, the prepared sample was transparent and showed a light transmittance of almost nearly 100% when measured with an integrating sphere light transmittance measuring instrument (manufactured by for example Shimadzu Corporation), according to Measurement Method A prescribed in JIS K 7105-1981 5.5 "Light Transmittance and Whole Light Reflectance".

Example 2-2

Glass plates (375 mm×375 mm, heat conductivity 0.8 W/(m·K), thickness 3 mm) were laminated on both sides of the heat-storage object 2-1 to give a sample. The same heat-retaining property test as in Example 2-1 was conducted except that the resulting test sample was used as the upper face of the test box. The evaluation results are shown in Table 2-3. The resulting sample was transparent.

Example 2-3

The starting materials shown in Table 2-1 were used, and a mixture of the heat-storage material 2-A and the surfactant, the hydroxyl group-containing compound and the isocyanate group-containing compound in the compounding amounts (heat-storage object 2-1) shown in Table 2-2 were mixed at a temperature of 40° C. under stirring at 1000 rpm with a stirring blade, to disperse the heat-storage material 2-A in a colloidal state (average particle diameter 190 μm), then the reaction accelerator was added, and the mixture was sufficiently stirred, then applied to a coating thickness of 3 mm by spraying onto a glass plate (375 mm×375 mm, heat conductivity 0.8 W/(m·K), thickness 3 mm) and cured for 5 hours. The NCO/OH ratio was 1.0. The resulting sample was examined in the same heat-retaining property test as in Example 2-1. The evaluation results are shown in Table 2-3. The resulting sample was transparent.

Example 2-4

A sample was prepared and examined in a heat-retaining property evaluation test in the same manner as in Example 2-1 except that the heat-storage object 2-2 produced by the following process was used in place of the heat-storage object 2-1. The results are shown in Table 2-3.

Heat-storage object 2-2: The starting materials shown in Table 2-1 were used, and a mixture of the heat-storage material 2-A, the surfactant and the organically treated layered clay mineral, the hydroxyl group-containing compound and the isocyanate group-containing compound in the compounding amounts shown in Table 2-2 were mixed at a temperature of 40° C. under stirring at 1000 rpm with a stirring blade, to disperse the heat-storage material 2-A in colloidal state (average particle diameter 460 μm), then the reaction accelerator was added, and the mixture was sufficiently stirred. After stirring, the mixture was poured into a mold of 350 mm×350 mm×3 mm laid with a 50 μm polyethylene terephthalate film (PET film), cured at 50° C. for 180 minutes and removed from the mold to give heat-storage object 2-2 of 3 mm in thickness. The NCO/OH ratio was 1.0.

Example 2-5

A sample was prepared and examined in a heat-retaining property evaluation test in the same manner as in Example 2-1 except that the heat-storage object 2-3 produced by the following process was used in place of the heat-storage object 2-1. The results are shown in Table 2-3.

Heat-storage object 2-3: The starting materials shown in Table 2-1 were used, and a mixture of the heat-storage material 2-A, the surfactant and the organically treated layered clay mineral, the hydroxyl group-containing compound and the isocyanate group-containing compound in the compounding amounts shown in Table 2-2 were mixed at temperature of 40° C. under stirring at 2000 rpm with a stirring blade, to disperse the heat-storage material 2-A in colloidal state (average particle diameter 200 μm), then the reaction accelerator was added, and the mixture was sufficiently stirred. After stirring, the mixture was poured into a mold of 350 mm×350 mm×3 mm laid with a 50 μm polyethylene terephthalate film (PET film), cured at 50° C. for 180 minutes and removed from the mold to give heat-storage object 2-3 of 3 mm in thickness. The NCO/OH ratio was 1.0.

Comparative Example 2-1

The same test as in Example 2-1 was carried out except that a glass plate (375 mm×375 mm, heat conductivity 0.8 W/(m·K), thickness 3 mm) only was used as the sample. The results are shown in Table 2-3.

Comparative Example 2-2

A backup material of 3 mm in thickness was arranged on the edge of a glass plate (375 mm×375 mm, heat conductivity 0.8 W/(m·K), thickness 3 mm), and a glass plate (375 mm×375 mm, heat conductivity 0.8 W/(m·K), thickness 3 mm) was laminated thereon, to give a sample provided with air layer of 3 mm in thickness. The same test as in Example 2-1 was carried out except that the resulting sample was used as the upper face of the test box. The results are shown in Table 2-3.

TABLE 2-1

| | |
|---|---|
| Heat-Storage Material 2-A | Methyl palmitate (phase change temperature, 30° C.; latent heat quantity 210 kJ/kg) |
| Surfactant | Polyoxyethylene sorbitan monopalmitate (HLB = 15.6) |
| Organically Treated Layered Clay Mineral | BENTONE 1000 (manufactured by Elementis Japan K.K.) |
| Hydroxyl Group-Containing Compound | Solventless polyester polyol: polycondensate of 2,4-diethyl-1,5-pentamethylene diol and adipic acid; hydroxyl value 60 mg KOH/g, molecular weight 2000 |
| Isocyanate Group-Containing Compound | HMDI-based polyisocyanate (isocyanurate type): NCO % 18.0% (solid content 100%) |
| Reaction Accelerator | Dibutyltin dilaurate |

TABLE 2-2

| | Heat-Storage Object 2-1 | Heat-Storage Object 2-2 | Heat-Storage Object 2-3 |
|---|---|---|---|
| Heat-Storage Material 2-A | 77.0 | 69.0 | 55.0 |
| Surfactant | 3.0 | 3.0 | 3.0 |
| Organically Treated Layered Clay Mineral | | 8.0 | 8.0 |
| Hydroxyl Group-Containing Compound | 16.0 | 16.0 | 26.4 |
| Isocyanate Group-Containing Compound | 4.0 | 4.0 | 7.1 |
| Reaction Accelerator | 0.1 | 0.1 | 0.1 |

* All numerical values are expressed in parts by weight.

TABLE 2-3

| | Surface Temperature | | Backside Temperature | | Space Temperature | |
|---|---|---|---|---|---|---|
| | Infrared Lamp Irradiation Time | | | | | |
| | 20 minutes later | 60 minutes later | 20 minutes later | 60 minutes later | 20 minutes later | 60 minutes later |
| Example 2-1 | 27.8° C. | 39.1° C. | 36.0° C. | 45.1° C. | 25.6° C. | 30.2° C. |
| Example 2-2 | 27.0° C. | 37.4° C. | 35.8° C. | 44.4° C. | 25.0° C. | 29.2° C. |
| Example 2-3 | 28.3° C. | 40.6° C. | 39.8° C. | 48.2° C. | 27.4° C. | 31.8° C. |
| Example 2-4 | 28.1° C. | 39.9° C. | 36.1° C. | 45.3° C. | 26.2° C. | 31.1° C. |
| Example 2-5 | 29.8° C. | 41.0° C. | 36.0° C. | 46.0° C. | 27.6° C. | 33.4° C. |
| Comparative Example 2-1 | 45.0° C. | 50.0° C. | 49.0° C. | 50.0° C. | 32.3° C. | 43.6° C. |
| Comparative Example 2-2 | 42.0° C. | 50.0° C. | 48.8° C. | 50.0° C. | 31.7° C. | 42.1° C. |

Examples 3-1 to 3-6, Comparative Examples 3-1 to 3-4

Example 3-1

The starting materials shown in Table 3-1 were used, and the heat-storage material 3-B, the surfactant 3-A, the hydroxyl group-containing compound 3-A and the reaction accelerator 3-A in the compounding amounts shown in Table 3-2 were mixed at temperature of 35° C. under stirring at 1000 rpm with a stirring blade, to disperse the heat-storage material 3-B in colloidal state (average particle diameter 180 μm), then the isocyanate group-containing compound 3-A was added, and the mixture was sufficiently stirred and then poured into a mold of 250 mm×170 mm×5 mm laid with a 50 μm polyethylene terephthalate film (PET film), cured at 50° C. for 180 minutes and removed from the mold to give heat-storage object. The NCO/OH ratio was 1.0.

The PET film surface of the resulting heat-storage object was laminated via adhesive with a polyurethane foam (250 mm×170 mm×25 mm, heat conductivity 0.03 W/(m·K), thickness 5 mm) to give a sample. The resulting sample was examined by the following tests.

(Heat-Storage Material Leakage Evaluation Test 1)

The resulting sample was left in atmosphere at 10° C. or 50° C. for 72 hours, then placed in an atmosphere at temperature of 23° C. in 50% relative humidity (referred to hereinafter as "standard condition") and observed for the leakage of the heat-storage material from the sample. Evaluation is as follows. The results are shown in Table 3-3.
⊚: Leakage was not observed.
○: Leakage was hardly observed.
x: Leakage was observed.

(Heat-Storage Material Leakage Evaluation Test 2)

The resulting sample was left in atmosphere at 10° C. or 50° C. for 72 hours, then placed in atmosphere at temperature of 30° C. in 50% relative humidity and observed for the leakage of the heat-storage material from the sample. Evaluation is as follows. The results are shown in Table 3-3.
⊚: Leakage was not observed.
○: Leakage was hardly observed.
x: Leakage was observed.

(Heat Storage Physical Property Test)

The phase change temperature (° C.) and latent heat quantity (kJ/kg) of the obtained sample were measured by differential scanning calorimetry (DSC) with DSC220CU (manufactured by Seiko Instruments Inc.). The sample was measured at rising temperature of 10° C./min in the temperature range of 20 to 60° C. with aluminum as a reference. The results are shown in Table 3-3.

(Processability Test 1)

The obtained sample was cut with a cutter knife under the standard condition and observed for the leakage of the heat-storage material from the cut surface. Evaluation is as follows. The results are shown in Table 3-3.
⊚: Leakage was not observed.
○: Leakage was hardly observed.
x: Leakage was observed.

(Processability Test 2)

The obtained sample was cut with a cutter knife in an atmosphere at temperature of 30° C. in 50% relative humidity and observed for the leakage of the heat-storage material from the cut surface. Evaluation is as follows. The results are shown in Table 3-3.
⊚: Leakage was not observed.
○: Leakage was hardly observed.
x: Leakage was observed.

(Applicability Test 1)

The obtained sample was nailed under the standard condition and observed for the leakage of the heat-storage material by nailing. Evaluation is as follows. The results are shown in Table 3-3.
⊚: Leakage was not observed.
○: Leakage was hardly observed.
x: Leakage was observed.

(Applicability Test 2)

The obtained sample was nailed in atmosphere at temperature of 30° C. in 50% relative humidity and observed for the leakage of the heat-storage material by nailing. Evaluation is as follows. The results are shown in Table 3-3.
⊚: Leakage was not observed.
○: Leakage was hardly observed.
x: Leakage was observed.

(Heat-Storage Heat Insulation Property Evaluation Test)

The sample was arranged on 4 sides of a simple box having external dimensions of 330 mm×330 mm×225 mm (prepared from 25-mm polystyrene foam) such that the surface of the heat-storage object was placed inside the box, and 5 mm calcium silicate board was arranged as the surface material. A calcium silicate board only was arranged at the bottom of the box, and the upper face of the box was polystyrene foam only. For temperature measurement, a thermocouple was arranged in the center of the box. This sample box was arranged in an incubator, and assuming that the temperature in the incubator was regarded as outside temperature and the temperature in the sample box as room temperature, the following experiment was carried out.

Assuming heating operation in winter, the box with the upper face kept open was maintained for 3 hours in the incubator set at 25° C., and thereafter, the upper face of the box was closed, and the temperature in the incubator was decreased to 5° C., and then the change in temperature in the space in the box was measured with time. The results are shown in FIG. 2.

Figure 2:
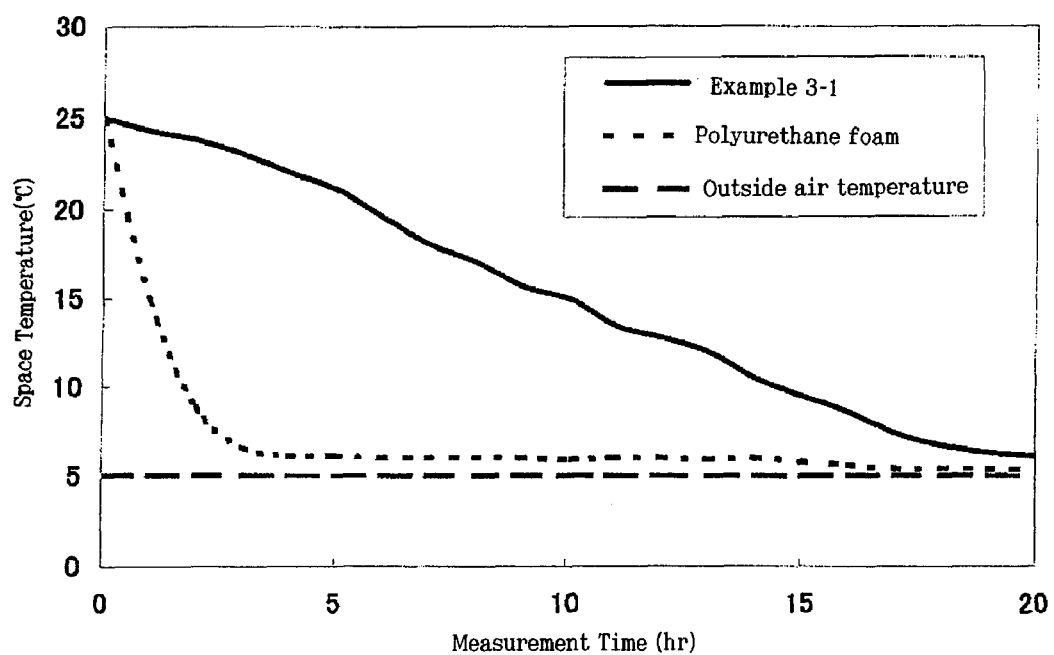
FIG. 2 is a graph showing the test results in examination of heat-storage heat insulation property in Example 3-1 and Comparative Example 3-1.

FIG. 2 also shows the results of the heat-storage heat insulation property test wherein a 10 mm polyurethane foam only (Comparative Example 3-1) was used in place of the sample (heat-storage heat insulation object) in Example 3-1.

FIG. 2 gives the results in which when the heat-storage heat insulation object is applied, the box hardly undergoes the influence of the outside temperature and shows less fluctuation in room temperature than with the polyurethane foam only (Comparative Example 3-1), thus indicating excellent heat-storage/heat insulating properties.

Example 3-2

The starting materials shown in Table 3-1 were used, and the heat-storage material 3-B, the surfactant 3-A, the organically treated layered clay mineral 3-A, the hydroxyl group-containing compound 3-A and the reaction accelerator 3-A in the compounding amounts shown in Table 3-2 were mixed at temperature of 35° C. under stirring at 1000 rpm with a stirring blade, to disperse the heat-storage material 3-B in colloidal state (average particle diameter 420 μm), then the isocyanate group-containing compound 3-A was added, and the mixture was sufficiently stirred and then poured into a mold of 250 mm×170 mm×5 mm laid with a 50 μm polyethylene terephthalate film (PET film), cured at 50° C. for 180 minutes and removed from the mold to give a heat-storage object. The NCO/OH ratio was 1.0.

The resulting heat-storage object was laminated via adhesive with polyurethane foam (250 mm×170 mm×5 mm, heat conductivity 0.03 W/(m·K), thickness 5 mm) to give a sample. The resulting sample was examined in the same heat-storage material leakage evaluation tests 1 and 2, heat-storage physical property test, processability tests 1 and 2, and applicability tests 1 and 2 as in Example 3-1. The results are shown in Table 3-3.

Supposing heating operation during the winter season, the heat-storage heat insulation property evaluation test was carried out in the same manner as in Example 3-1. The results are shown in FIG. 3.

Figure 3:
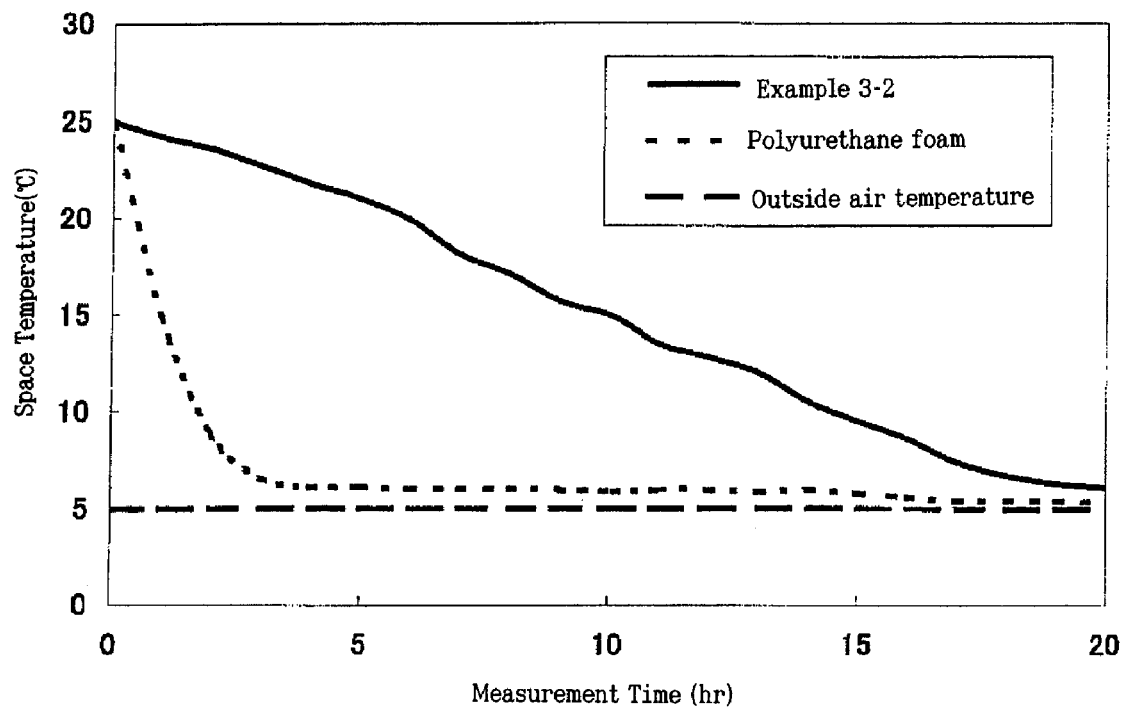
FIG. 3 is a graph showing the test results in examination of heat-storage heat insulation property in Example 3-2 and Comparative Example 3-1.

FIG. 3 gives the results of the heat-storage heat insulation property evaluation test in which the box hardly undergoes the influence of the outside temperature and shows less fluctuation in room temperature than with the polyurethane foam only (Comparative Example 3-1), thus indicating excellent heat-storage/heat insulating properties.

Example 3-3

The starting materials shown in Table 3-1 were used, and the heat-storage material 3-A, the surfactant 3-B, the organically treated layered clay mineral 3-A, the hydroxyl group-containing compound 3-B and the reaction accelerator 3-A in the compounding amounts shown in Table 3-2 were mixed at temperature of 23° C. under stirring at 1000 rpm with a stirring blade, to disperse the heat-storage material 3-A in colloidal state (average particle diameter 500 μm), then the isocyanate group-containing compound 3-B was added, and the mixture was sufficiently stirred and then poured into a mold of 250 mm×170 mm×5 mm laid with a 50 μm polyethylene terephthalate film (PET film), cured at 50° C. for 180 minutes and removed from the mold to give a heat-storage object. The NCO/OH ratio was 1.0.

The resulting heat-storage object was laminated via adhesive with polyurethane foam (250 mm×170 mm×5 mm, heat conductivity 0.03 W/(m·K), thickness 5 mm) to give a sample. The resulting sample was examined in the same heat-storage material leakage evaluation tests 1 and 2, heat storage physical property test, processability tests 1 and 2, and applicability tests 1 and 2 as in Example 3-1. The results are shown in Table 3-3.

The heat-storage heat insulation property evaluation test was carried out in the same manner as in Example 3-1 except that supposing heating operation during the winter season, the box with the upper face kept open was maintained for 3 hours in an incubator set at 20° C. The results are shown in FIG. 4.

Figure 4:
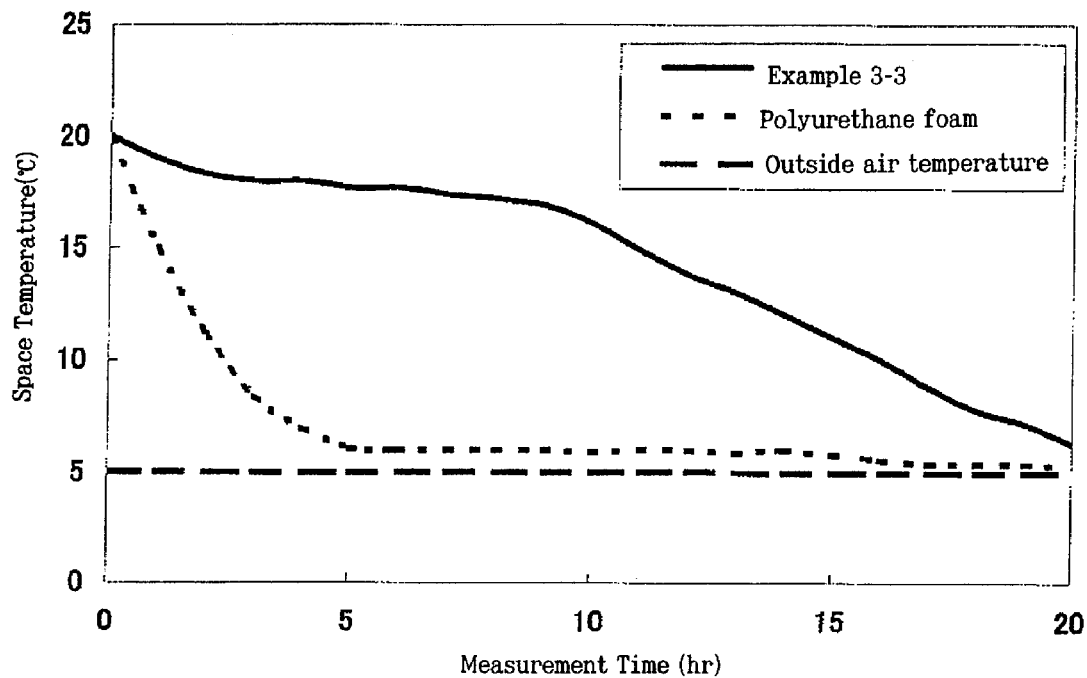
FIG. 4 is a graph showing the test results in examination of heat-storage heat insulation property in Example 3-3 and Comparative Example 3-1.

FIG. 4 gives the results of the heat-storage heat insulation property evaluation test in which the box hardly undergoes the influence of the outside temperature and shows less fluctuation in room temperature than with the polyurethane foam only (Comparative Example 3-1), thus indicating excellent heat-storage/heat insulating properties.

Example 3-4

The starting materials shown in Table 3-1 were used, and the heat-storage material 3-A, the heat-storage material 3-B, the surfactant 3-A, the organically treated layered clay mineral 3-A, the hydroxyl group-containing compound 3-A and the reaction accelerator 3-A in the compounding amounts shown in Table 3-2 were mixed at temperature of 35° C. under stirring at 1000 rpm with a stirring blade, to disperse the heat-storage materials 3-A and 3-B in colloidal state (average particle diameter 480 μm), then the isocyanate group-containing compound 3-A was added, and the mixture was sufficiently stirred and then poured into a mold of 250 mm×170 mm×5 mm laid with 50 μm polyethylene terephthalate film (PET film), cured at 50° C. for 180 minutes and removed from the mold to give a heat-storage object. The NCO/OH ratio was 1.0.

The resulting heat-storage object was laminated via an adhesive with polyurethane foam (250 mm×170 mm×5 mm, heat conductivity 0.03 W/(m·K), thickness 5 mm) to give a sample. The resulting sample was examined in the same heat-storage material leakage evaluation tests 1 and 2, heat storage physical property test, processability tests 1 and 2, and applicability tests 1 and 2 as in Example 3-1. The results are shown in Table 3-3.

Supposing heating operation during the winter season, the heat-storage/heat insulation property evaluation test was carried out in the same manner as in Example 3-1. The results are shown in FIG. 5.

Figure 5:
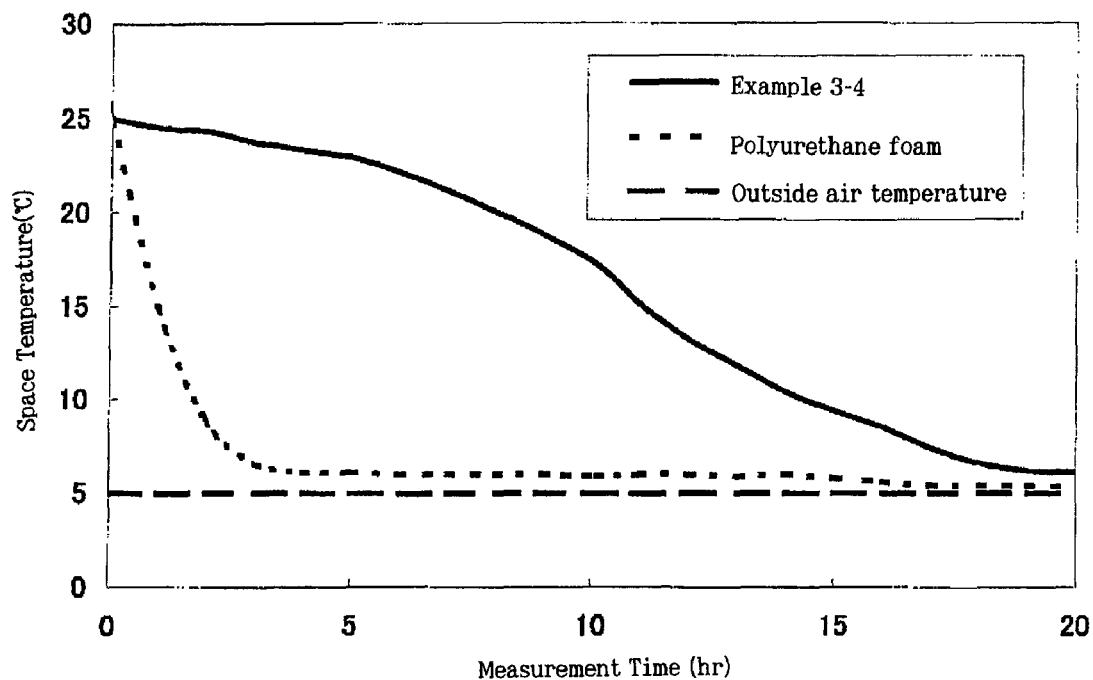
FIG. 5 is a graph showing the test results in examination of heat-storage heat insulation property in Example 3-4 and Comparative Example 3-1.

FIG. 5 gives the results of the heat-storage heat insulation property evaluation test in which the box hardly undergoes the influence of the outside temperature and shows less fluctuation in room temperature than with the polyurethane foam only (Comparative Example 3-1), thus indicating excellent heat-storage/heat insulating properties.

Example 3-5

The starting materials shown in Table 3-1 were used, and the heat-storage material 3-A, the heat-storage material 3-B, the surfactant 3-A, the compatibilizing agent 3-A, the organically treated layered clay mineral 3-A, the hydroxyl group-containing compound 3-A and the reaction accelerator 3-A in the compounding amounts shown in Table 3-2 were mixed at temperature of 35° C. under stirring at 1000 rpm with a stirring blade, to disperse the heat-storage materials 3-A and 3-B in colloidal state (average particle diameter 600 μm), then the isocyanate group-containing compound 3-A was added, and the mixture was sufficiently stirred and then poured into a mold of 250 mm×170 mm×5 mm laid with 50 μm polyethylene terephthalate film (PET film), cured at 50° C. for 180 minutes and removed from the mold to give a heat-storage object. The NCO/OH ratio was 1.0.

The resulting heat-storage object was laminated via adhesive with polyurethane foam (250 mm×170 mm×5 mm, heat conductivity 0.03 W/(m·K), thickness 5 mm) to give a sample. The resulting sample was examined in the same heat-storage material leakage evaluation tests 1 and 2, heat storage physical property test, processability tests 1 and 2, and applicability tests 1 and 2 as in Example 3-1. The results are shown in Table 3-3.

Supposing heating operation during the winter season, the heat-storage heat insulation property evaluation test was carried out in the same manner as in Example 3-1. The results are shown in FIG. 6.

Figure 6:
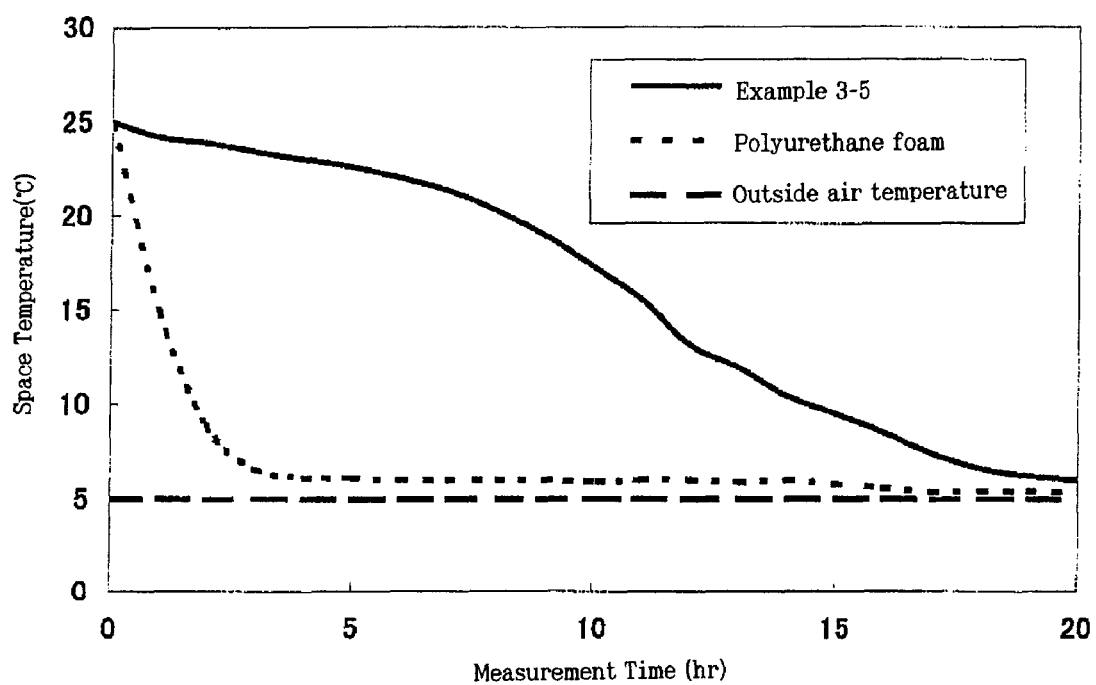
FIG. 6 is a graph showing the test results in examination of heat-storage heat insulation property in Example 3-5 and Comparative Example 3-1.

FIG. 6 gives the results of the heat-storage heat insulation property evaluation test in which the box hardly undergoes the influence of the outside temperature and shows less fluctuation in room temperature than with the polyurethane foam only (Comparative Example 3-1), thus indicating excellent heat-storage/heat insulating properties.

Example 3-6

The starting materials shown in Table 3-1 were used, and the heat-storage material 3-B, the surfactant 3-B, the organically treated layered clay mineral 3-A, the hydroxyl group-containing compound 3-B and the reaction accelerator 3-A in the compounding amounts shown in Table 3-2 were mixed at temperature of 35° C. under stirring at 2000 rpm with a stirring blade, to disperse the heat-storage material 3-B in colloidal state (average particle diameter 200 μm), then the isocyanate group-containing compound 3-B was added, and the mixture was sufficiently stirred and then poured into a mold of 250 mm×170 mm×5 mm laid with a 50 μm polyethylene terephthalate film (PET film), cured at 50° C. for 180 minutes and removed from the mold to give a heat-storage object. The NCO/OH ratio was 1.0.

The resulting heat-storage object was laminated via adhesive with polyurethane foam (250 mm×170 mm×5 mm, heat conductivity 0.03 W/(m·K), thickness 5 mm) to give a sample. The resulting sample was examined in the same heat-storage material leakage evaluation tests 1 and 2, heat storage physical property test, processability tests 1 and 2, and applicability tests 1 and 2 as in Example 3-1. The results are shown in Table 3-3.

Supposing heating operation during the winter season, the heat-storage heat insulation property evaluation test was carried out in the same manner as in Example 3-1. The results are shown in FIG. 7.

Figure 7:
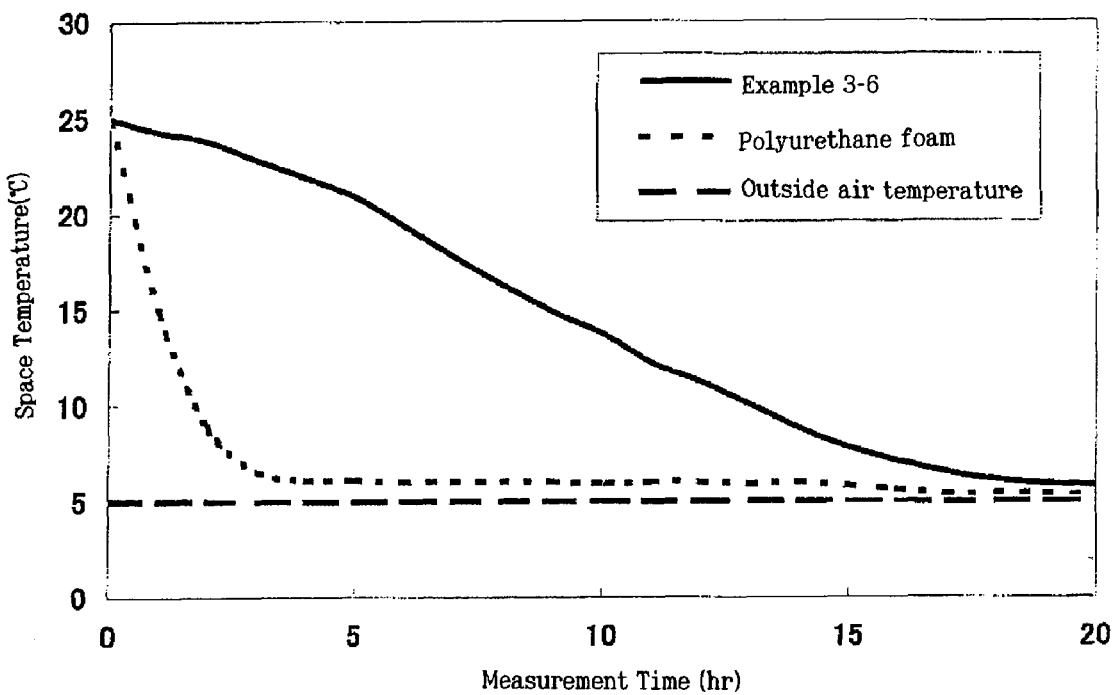
FIG. 7 is a graph showing the test results in examination of heat-storage heat insulation property in Example 3-6 and Comparative Example 3-1.

FIG. 7 gives the results of the heat-storage heat insulation property evaluation test in which the box hardly undergoes the influence of the outside temperature and shows less fluctuation in room temperature than with the polyurethane foam only (Comparative Example 3-1), thus indicating excellent heat-storage/heat insulating properties.

Comparative Example 3-1

The same processability test, applicability test and heat-storage heat insulation evaluation property test as in Example 3-1 were carried out except that polyurethane foam (250 mm×170 mm×5 mm, heat conductivity 0.03 W/(m·K), thickness 5 mm) only was used in place of the heat-storage heat insulation object obtained in Example 3-1. The heat-storage heat insulation evaluation property test as in Examples 3-2 to 3-6 was also carried out. The results are shown in Table 3-3 and FIGS. 2 to 7.

Comparative Example 3-2

Slurry prepared by mixing 35 parts by weight of heat-storage material microcapsule aqueous dispersion (solid content, 50%; heat-storage material content, 40 wt %; capsule component, melamine resin) containing the organic latent heat-storage material 3-A shown in Table 3-1, 25 parts by weight of water and 40 parts by weight of calcined gypsum was poured into a mold of 250 mm×170 mm×5 mm, dried at 50° C. for 12 hours and removed from the mold to give a sample. The resulting sample was tested in the same heat-storage material leakage evaluation test, heat storage physical property test, processability test and applicability test as in Example 3-1. The results are shown in Table 3-3.

Comparative Example 3-3

The heat-storage material 3-A shown in Table 3-1 was laminated with an aluminum-deposited polyethylene terephthalate sheet (250 mm×170 mm×5 mm) to give a sample. The resulting sample was tested in the same heat-storage material leakage evaluation test, heat storage physical property test, processability test and applicability test as in Example 3-1. The results are shown in Table 3-3.

In the heat storage physical property test, the sample could not be directly measured, and thus from the physical properties of the heat-storage material, the physical properties were determined on the basis of the heat conductivity and weight of the sheet.

Comparative Example 3-4

The heat-storage material 3-A shown in Table 3-1 was formed with gelatin into capsules (grain diameter 3 mm, heat-storage material content 70%) and packed in a case of polyethylene terephthalate sheet (250 mm×170 mm×5 mm) to give a sample. The resulting sample was tested in the same heat-storage material leakage evaluation test, heat storage physical property test, processability test and applicability test as in Example 3-1. The results are shown in Table 3-3.

In the heat storage physical property test, the sample could not be directly measured, and thus from the physical properties of the heat-storage material, the physical properties were determined on the basis of the heat conductivity and weight of the gelatin coating and the case of polyethylene terephthalate.

TABLE 3-1

| | |
|---|---|
| Heat-Storage Material 3-A | Methyl myristate (phase change temperature, 19.0° C.; latent heat quantity 190 kJ/kg) |
| Heat-Storage Material 3-B | Methyl palmitate (phase change temperature, 30.0° C.; latent heat quantity 210 kJ/kg) |
| Compatibilizing Agent 3-A | Refined palm oil (fatty acid triglyceride, phase change temperature 20 to 23° C., latent heat quantity 116 kJ/kg) |
| Surfactant 3-A | Polyoxyethylene sorbitan monopalmitate (HLB = 15.6) |
| Surfactant 3-B | Polyoxyethylene sorbitan monostearate (HLB = 14.9) |
| Organically Treated Layered Clay Mineral 3-A | BENTONE 1000 (manufactured by Elementis Japan K.K.) |
| Hydroxyl Group-Containing Compound 3-A | Solventless polyester polyol: polycondensate of 2,4-diethyl-1,5-pentamethylene diol and adipic acid; hydroxyl value 60 mg KOH/g, molecular weight 2000 |
| Hydroxyl Group-Containing Compound 3-B | Solventless polyether polyol: propylene oxide polycondensate of glycerin skeleton; hydroxyl value 40 mg KOH/g, molecular weight 4000 |
| Isocyanate Group-Containing Compound 3-A | HMDI-based polyisocyanate (isocyanurate type): NCO % 17.0% (solid content 100%) |
| Isocyanate Group-Containing Compound 3-B | HMDI-based polyisocyanate (isocyanurate type): NCO % 13.0% (solid content 100%) |
| Reaction Accelerator 3-A | Dibutyltin dilaurate |

TABLE 3-2

| | Example 3-1 | Example 3-2 | Example 3-3 | Example 3-4 | Example 3-5 | Example 3-6 |
|---|---|---|---|---|---|---|
| Heat-Storage Material 3-A | | | 68.0 | 12.0 | 12.0 | |
| Heat-Storage Material 3-B | 70.0 | 65.0 | | 48.0 | 48.0 | 55.0 |
| Compatibilizing Agent 3-A | | | | | 1.0 | |
| Compatibilizing Agent 3-B | | | | | | |
| Surfactant 3-A | 3.0 | 3.0 | | 3.0 | 3.0 | |
| Surfactant 3-B | | | 4.0 | | | 3.0 |
| Organically Treated Layered Clay Mineral 3-A | | 8.0 | 7.0 | 8.0 | 9.0 | 8.0 |

TABLE 3-2-continued

|  | Example 3-1 | Example 3-2 | Example 3-3 | Example 3-4 | Example 3-5 | Example 3-6 |
|---|---|---|---|---|---|---|
| Hydroxyl Group-Containing Compound 3-A | 21.0 | 20.0 |  | 22.0 | 21.0 |  |
| Hydroxyl Group-Containing Compound 3-B |  |  | 16.0 |  |  | 26.8 |
| Isocyanate Group-Containing Compound 3-A | 6.0 | 5.0 |  | 6.0 | 6.0 |  |
| Isocyanate Group-Containing Compound 3-B |  |  | 4.0 |  |  | 6.7 |
| Reaction Accelerator 3-A | 0.5 | 0.5 | 0.5 | 0.5 | 0.5 | 0.5 |

*All numerical values are expressed in parts by weight.

TABLE 3-3

|  | Example 3-1 | Example 3-2 | Example 3-3 | Example 3-4 | Example 3-5 | Example 3-6 | Comparative Example 3-1 | Comparative Example 3-2 | Comparative Example 3-3 | Comparative Example 3-4 |
|---|---|---|---|---|---|---|---|---|---|---|
| Heat-storage Material Leakage Evaluation 1 |  |  |  |  |  |  |  |  |  |  |
| In 10° C. Atmosphere | ◎ | ◎ | ◎ | ◎ | ◎ | ◎ | — | ○ | ◎ | ◎ |
| In 50° C. Atmosphere | ◎ | ◎ | ◎ | ◎ | ◎ | ◎ | — | ○ | ◎ | ◎ |
| Heat-Storage Material Leakage Evaluation 2 |  |  |  |  |  |  |  |  |  |  |
| In 10° C. Atmosphere | ◎ | ◎ | ◎ | ◎ | ◎ | ◎ | — | — | — | — |
| In 50° C. Atmosphere | ◎ | ◎ | ◎ | ◎ | ◎ | ◎ | — | — | — | — |
| Heat Storage Physical Properties |  |  |  |  |  |  |  |  |  |  |
| Phase Change Temperature (° C.) | 27.1 | 26.4 | 18.4 | 23.1 | 21.8 | 26.2 | — | 17.1 | 18.7 | 17.4 |
| Latent Heat Quantity (kJ/kg) | 152 | 138 | 132 | 130 | 128 | 116 | — | 35.3 | 179 | 135 |
| Processability Test 1 | ◎ | ◎ | ◎ | ◎ | ◎ | ◎ | ◎ | X | *1 | *1 |
| Processability Test 2 | ◎ | ◎ | ◎ | ◎ | ◎ | ◎ | — | — | — | — |
| Applicability Test 1 | ◎ | ◎ | ◎ | ◎ | ◎ | ◎ | ◎ | X | *2 | *2 |
| Applicability Test 2 | ◎ | ◎ | ◎ | ◎ | ◎ | ◎ | — | — | — | — |

*1: Cutting with a cutter knife was difficult.
*2: Nailing was difficult.

Examples 4-1 to 4-3, Comparative Examples 4-1 to 4-2

(Production of Heat-Storage Objects)

Heat-storage object 4-1: The starting materials shown in Table 4-1 were used, and the heat-storage material 4-A, the surfactant, the hydroxyl group-containing compound and the isocyanate group-containing compound in the compounding amounts shown in Table 4-2 were mixed at temperature of 40° C. under stirring at 2000 rpm with a stirring blade, to disperse the heat-storage material 4-A in colloidal state (average particle diameter 190 µm), then the reaction accelerator was added, and the mixture was sufficiently stirred. After stirring, the mixture was poured into a mold of 300 mm×180 mm×5 mm laid with a 50 µm polyethylene terephthalate film (PET film), removed from the mold and cured at 50° C. for 180 minutes to give heat-storage object 4-1 of 5 mm in thickness. The NCO/OH ratio was 1.0.

Heat-storage object 4-2: The starting materials shown in Table 4-1 were used, and the heat-storage material 4-A, the surfactant, the hydroxyl group-containing compound, the organically treated layered clay mineral and the isocyanate group-containing compound in the compounding amounts shown in Table 4-2 were mixed at temperature of 40° C. under stirring at 1000 rpm with a stirring blade, to disperse the heat-storage material 4-A in colloidal state (average particle diameter 440 µm), then the reaction accelerator was added, and the mixture was sufficiently stirred. After stirring, the mixture was poured into a mold of 300 mm×180 mm×5 mm laid with a 50 µm polyethylene terephthalate film (PET film), cured at 50° C. for 120 minutes and removed from the mold to give heat-storage object 4-2 of 5 mm in thickness. The NCO/OH ratio was 1.0.

Heat-storage object 4-3: The starting materials shown in Table 4-1 were used, and the heat-storage material 4-A, the surfactant, the hydroxyl group-containing compound, the organically treated layered clay mineral and the isocyanate group-containing compound in the compounding amounts shown in Table 4-2 were mixed at temperature of 40° C. under stirring at 2000 rpm with a stirring blade, to disperse the heat-storage material 4-A in colloidal state (average particle diameter 200 μm), then the reaction accelerator was added, and the mixture was sufficiently stirred. After stirring, the mixture was poured into a mold of 300 mm×180 mm×5 mm laid with a 50 μm polyethylene terephthalate film (PET film), cured at 50° C. for 120 minutes and removed from the mold to give heat-storage object 4-3 of 5 mm in thickness. The NCO/OH ratio was 1.0.

Heat-storage object 4-4: Slurry prepared by mixing 35 parts by weight of heat-storage material microcapsule aqueous dispersion (solid content, 50%; heat-storage material content, 40 wt %; capsule component, melamine resin) containing the heat-storage material 4-A shown in Table 4-1, 25 parts by weight of water and 40 parts by weight of calcined gypsum was poured into a mold of 300 mm×180 mm×5 mm, dried at 50° C. for 12 hours and removed from the mold to give heat-storage object 4-4 of 5 mm in thickness.

Heat-storage object 4-5: The heat-storage material 4-A shown in Table 1 was laminated with an aluminum-deposited polyethylene terephthalate sheet (300 mm×180 mm) and removed from a mold to give heat-storage object 4-5 of 5 mm in thickness.

Heat-storage object 4-6: The heat-storage material 4-A shown in Table 4-1 was formed with gelatin into capsules (grain diameter 3 mm, heat-storage material content 70%) and packed in a case of polyethylene terephthalate sheet (300 mm×180 mm×5 mm) and removed from a mold to give heat-storage object 4-6 of 5 mm in thickness.

(Heat-Storage Material Evaluation Test 1)

The resulting sample was left in atmosphere at 10° C. or 50° C. for 72 hours, then placed in an atmosphere at temperature of 23° C. in 50% relative humidity (referred to hereinafter as "standard condition") and observed for the leakage of the heat-storage material from the sample. Evaluation is as follows.

The results are shown in Table 4-3.

⊚: Leakage was not observed.
○: Leakage was hardly observed.
x: Leakage was observed.

(Heat-Storage Material Evaluation Test 2)

The resulting sample was left in atmosphere at 10° C. or 50° C. for 72 hours, then placed in an atmosphere at temperature of 30° C. in 50% relative humidity and observed for the leakage of the heat-storage material from the sample. Evaluation is as follows. The results are shown in Table 4-3.

⊚: Leakage was not observed.
○: Leakage was hardly observed.
x: Leakage was observed.

(Heat Storage Physical Property Test)

The phase change temperature (° C.) and latent heat quantity (kJ/kg) of the obtained heat-storage object were measured by differential scanning calorimetry (DSC) with DSC220CU (manufactured by Seiko Instruments Inc.). The sample was measured at rising temperature of 10° C./min in the temperature range of 20 to 60° C. with aluminum as reference. The results are shown in Table 4-3.

(Processability Test 1)

The obtained heat-storage object was cut with a cutter knife under the standard condition and observed for the leakage of the heat-storage material from the cut surface. Evaluation is as follows. The results are shown in Table 4-3.

⊚: Leakage was not observed.
○: Leakage was hardly observed.
x: Leakage was observed.

(Processability Test 2)

The obtained heat-storage object was cut with a cutter knife in atmosphere at temperature of 30° C. in 50% relative humidity and observed for the leakage of the heat-storage material from the cut surface. Evaluation is as follows. The results are shown in Table 4-3.

⊚: Leakage was not observed.
○: Leakage was hardly observed.
x: Leakage was observed.

(Applicability Test 1)

The obtained heat-storage object was nailed under the standard condition and observed for the leakage of the heat-storage material by nailing. Evaluation is as follows.

The results are shown in Table 4-3.

⊚: Leakage was not observed.
○: Leakage was hardly observed.
x: Leakage was observed.

(Applicability Test 2)

The obtained heat-storage object was nailed in atmosphere at temperature of 30° C. in 50% relative humidity and observed for the leakage of the heat-storage material by nailing. Evaluation is as follows. The results are shown in Table 4-3.

⊚: Leakage was not observed.
○: Leakage was hardly observed.
x: Leakage was observed.

Example 4-1

The heat-storage object 4-1 (FIG. 1 the heat-storage object: 7), a sheet heating element and a floor material were laminated in this order on plywood (300×180 mm, thickness 5 mm) to prepare a test plate. As the floor material, plywood (300×180 mm, thickness 5 mm) was used, and as the sheet heating element, a silicon rubber heater (300×180 mm, thickness 2 mm) having a nichrom wire meanderingly arranged in silicon rubber was used.

Figure 8:
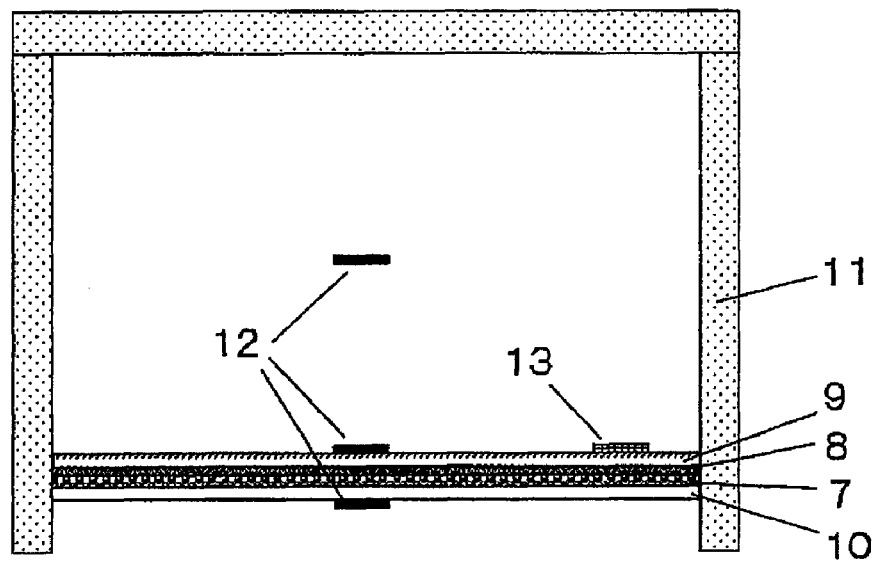
FIG. 8 is a sectional view of the sample box used in Example 4-1.

As shown in FIG. 8, a sample box was prepared in which polystyrene foams 11 (each having thickness of 25 mm) were arranged in 4 sides and upper face to form a box having inner dimensions of 300×180×200 mm, and the test plate was arranged in the bottom such that the floor material was placed inside the box.

As shown in FIG. 8, thermocouples 12 were arranged in the center of the floor material 9 surface, in the center of the backside (plywood: 10) and in a position at height of 100 mm over the center of the floor material 9 surface, in order to measure the floor surface temperature, the floor backside temperature and the space temperature (temperature in the box). As shown in FIG. 8, a temperature controller (thermostat: 13) was attached to the floor surface to keep the temperature of the floor surface constant.

This sample box was arranged in an incubator, and the following experiment was carried out. The incubator wherein the temperature was set at 10° C. was left for 15 hours. Thereafter, the temperature in the incubator was set at 10° C., while the sheet heating element 8 was heated at 180° C. The floor surface was set at 30° C. by the temperature controller (thermostat: 13).

In evaluation of floor heating ability, the temperature of each site 60 minutes after heating of the sheet heating element 8 was measured. After heating for 180 minutes, heating was concluded, and the temperature of each site was measured 60 minutes after conclusion of heating. The results are shown in Table 4-4.

Example 4-2

A test was carried out in the same manner as in Example 4-1 except that the heat-storage object 4-2 was used in place of the heat-storage object 4-1. The results are shown in Table 4-4.

Example 4-3

A test was carried out in the same manner as in Example 4-1 except that the heat-storage object 4-3 was used in place of the heat-storage object 4-1. The results are shown in Table 4-4.

Comparative Example 4-1

A backup material of 5 mm in thickness was arranged on the edge of plywood (300×180 mm, thickness 5 mm), and a sheet heating element and a floor material were laminated in this order thereon, to prepare a test plate in which air layer of 5 mm in thickness was arranged between the plywood and the sheet heating element. A test was carried out in the same manner as in Example 4-1 except that this test plate was used. The results are shown in Table 4-4.

Comparative Example 4-2

A polyurethane foam of 5 mm in thickness was arranged on plywood (300×180 mm, thickness 5 mm), and a sheet heating element and a floor material were laminated in this order thereon, to prepare a test plate. A test was carried out in the same manner as in Example 4-1 except that this test plate was used. The results are shown in Table 4-4.

TABLE 4-1

| | |
|---|---|
| Heat-Storage Material 4-A | Methyl palmitate (phase change temperature, 30° C.; latent heat quantity 210 kJ/kg) |
| Surfactant | Polyoxyethylene sorbitan monopalmitate (HLB = 15.6) |
| Organically Treated Layered Clay Mineral | BENTONE 34 (manufactured by Elementis Japan K.K.) |
| Hydroxyl Group-Containing Compound | Solventless polyester polyol: polycondensate of 2,4-diethyl-1,5-pentamethylene diol and adipic acid; hydroxyl value 60 mg KOH/g, molecular weight 2000 |
| Isocyanate Group-Containing Compound | HMDI-based polyisocyanate (isocyanurate type): NCO % 17.0% (solid content 100%) |
| Reaction Accelerator | Dibutyltin dilaurate |

TABLE 4-2

| | Heat-Storage Object 4-1 | Heat-Storage Object 4-2 | Heat-Storage Object 4-3 |
|---|---|---|---|
| Heat-Storage Material 4-A | 77.0 | 69.0 | 55.0 |
| Heat-Storage Material 4-B | | | |
| Compatibilizing Agent | | | |
| Surfactant | 3.0 | 3.0 | 3.0 |
| Organically Treated Layered Clay Mineral | | 8.0 | 8.0 |
| Hydroxyl Group-Containing compound | 15.8 | 15.8 | 26.8 |
| Isocyanate Group-Containing Compound | 4.2 | 4.2 | 7.1 |
| Reaction Accelerator | 0.1 | 0.1 | 0.1 |

\* All numerical values are expressed in parts by weight.

TABLE 4-3

| | Heat-Storage Object 4-1 | Heat-Storage Object 4-2 | Heat-Storage Object 4-3 | Heat-Storage Object 4-4 | Heat-Storage Object 4-5 | Heat-Storage Object 4-6 |
|---|---|---|---|---|---|---|
| Heat-Storage Material Leakage Evaluation 1 | | | | | | |
| In 10° C. Atmosphere | ◎ | ◎ | ◎ | ○ | ◎ | ◎ |
| In 50° C. Atmosphere | ◎ | ◎ | ◎ | ○ | ◎ | ◎ |
| Heat-Storage Material Leakage Evaluation 2 | | | | | | |
| In 10° C. Atmosphere | ◎ | ◎ | ◎ | ◎ | ◎ | ◎ |
| In 50° C. Atmosphere | ◎ | ◎ | ○ | ○ | ○ | ○ |
| Heat Storage Physical Properties | | | | | | |
| Phase Change Temperature (° C.) | 30.0 | 30.0 | 29.0 | 30.0 | 30.0 | 30.0 |

TABLE 4-3-continued

|  | Heat-Storage Object 4-1 | Heat-Storage Object 4-2 | Heat-Storage Object 4-3 | Heat-Storage Object 4-4 | Heat-Storage Object 4-5 | Heat-Storage Object 4-6 |
| --- | --- | --- | --- | --- | --- | --- |
| Latent Heat Quantity (kJ/kg) | 157 | 154 | 120 | 60 | 200 | 140 |
| Processability Test 1 | ⊚ | ⊚ | ⊚ | X | *1 | *1 |
| Processability Test 2 | ⊚ | ⊚ | ⊚ |  |  |  |
| Applicability Test 1 | ⊚ | ⊚ | ⊚ |  |  |  |
| Applicability Test 2 | ⊚ | ⊚ | ⊚ | X | *2 | *2 |

*1: Cutting with a cutter knife was difficult.
*2: Nailing was difficult.

TABLE 4-4

|  | 60 Minutes after Heating | | | 60 Minutes after Heating Was Concluded | | |
| --- | --- | --- | --- | --- | --- | --- |
|  | Floor Surface Temperature | Space Temperature | Floor Backside Temperature | Floor Surface Temperature | Space Temperature | Floor Backside Temperature |
| Example 4-1 | 30.0° C. | 20.2° C. | 16.8° C. | 21.6° C. | 16.2° C. | 15.7° C. |
| Example 4-2 | 30.0° C. | 20.4° C. | 16.9° C. | 21.9° C. | 16.4° C. | 15.8° C. |
| Example 4-3 | 30.0° C. | 19.1° C. | 16.2° C. | 20.0° C. | 15.5° C. | 14.8° C. |
| Comparative Example 4-1 | 30.0° C. | 17.3° C. | 19.0° C. | 14.3° C. | 11.2° C. | 11.2° C. |
| Comparative Example 4-2 | 30.0° C. | 17.5° C. | 17.8° C. | 14.5° C. | 12.0° C. | 11.0° C. |

Examples 5-1 to 5-3

Example 5-1

The starting materials shown in Table 5-1 were used, and the heat-storage material 5-A, the surfactant, the hydroxyl group-containing compound and the isocyanate group-containing compound in the compounding amounts shown in Table 5-2 were mixed at temperature of 50° C. under stirring at 2000 rpm with a stirring blade, to disperse the heat-storage material 5-A in colloidal state (average particle diameter 200 μm), then the reaction accelerator was added, and the mixture was sufficiently stirred to give heat-storage slurry. The resulting heat-storage slurry was casted into a mold (100 mm×100 mm×5 mm), cured at 80° C. for 30 minutes and removed from the mold to give a heat insulator of 5 mm in thickness. This heat insulator was prepared in duplicate. The two heat insulators thus obtained were used in the following test.
(Heat Retaining Property Test)

The resulting heat insulators (2 sheets) were irradiated with microwaves (2450 MHz) in an microwave oven and then removed from the microwave oven, and the 2 heat insulator sheets were laminated with each other with a thermocouple sandwiched therebetween to prepare a sample. This sample was left in atmosphere at temperature of 23° C. in 50% relative humidity and measured for change in temperature with time. In the heat retaining property test, the sample was evaluated by measuring the temperature just after irradiation with microwaves (after 0 hour), 2 hours after the irradiation and 4 hours after the irradiation. With this operation given as 1 cycle, 100 cycles in total were carried out, and the temperature in the first cycle, $50^{th}$ cycle and $100^{th}$ cycle was measured to evaluate reusability. The results are shown in Table 5-3.

Example 5-2

A heat insulator was obtained in the same manner as in Example 5-1 except that the starting materials shown in Table 5-1 were used, and the heat-storage material 5-A, the surfactant, the organically treated layered clay mineral, the hydroxyl group-containing compound and the isocyanate group-containing compound in the compounding amounts shown in Table 5-2 were mixed at temperature of 50° C. under stirring at 1000 rpm with a stirring blade, to disperse the heat-storage material 5-A in colloidal state (average particle diameter 420 μm), then the reaction accelerator was added, and the mixture was sufficiently stirred to give heat-storage slurry. The resulting heat insulator was examined in the same test as in Example 1. The results are shown in Table 5-3.

Example 5-3

A heat insulator was obtained in the same manner as in Example 5-1 except that the starting materials shown in Table 5-1 were used, and the heat-storage material 5-A, the surfactant, the organically treated layered clay mineral, the hydroxyl group-containing compound and the isocyanate group-containing compound in the compounding amounts shown in Table 5-2 were mixed at temperature of 50° C. under stirring at 1000 rpm with a stirring blade, to disperse the heat-storage material 5-A in colloidal state (average particle diameter 400 μm), then the reaction accelerator was added, and the mixture was sufficiently stirred to give heat-storage slurry. The resulting heat insulator was examined in the same test as in Example 5-1. The results are shown in Table 5-3.

TABLE 5-1

| | |
|---|---|
| Heat-Storage Material 5-A | Methyl stearate; phase change temperature, 38.0° C.; latent heat quantity 230 kJ/kg |
| Surfactant | Polyoxyethylene sorbitan monopalmitate (HLB = 15.6) |
| Organically Treated Layered Clay Mineral | Esben N-400 (manufactured by Hojun Co., Ltd.) |
| Hydroxyl Group-Containing compound | Solventless polyether polyol: propylene oxide polycondensate of glycerin skeleton; hydroxyl value 40 mg KOH/g, molecular weight 4000 |
| Isocyanate Group-Containing Compound | HMDI-based polyisocyanate (isocyanurate type): NCO % 18.0% (solid content 100%) |
| Reaction Accelerator | Dibutyltin dilaurate |

TABLE 5-2

| | Example 5-1 | Example 5-2 | Example 5-3 |
|---|---|---|---|
| Heat-Storage Material 5-A | 75.0 | 70.0 | 55.0 |
| Surfactant | 1.0 | 1.0 | 1.0 |
| Organically Treated Layered Clay Mineral | | 5.0 | 4.0 |
| Hydroxyl Group-Containing compound | 20.5 | 20.5 | 33.7 |
| Isocyanate Group-Containing Compound | 3.4 | 3.4 | 6.2 |
| Reaction Accelerator | 0.1 | 0.1 | 0.1 |

* All numerical values are expressed in parts by weight.

TABLE 5-3

| Heat insulation test | | Example 5-1 | Example 5-2 | Example 5-3 |
|---|---|---|---|---|
| 1$^{st}$ time | after 0 hour | 46.0 | 46.2 | 47.8 |
| | after 2 hours | 37.8 | 37.4 | 36.5 |
| | after 4 hours | 33.5 | 31.3 | 27.4 |
| 50$^{th}$ time | after 0 hour | 45.9 | 46.2 | 48.0 |
| | after 2 hours | 37.5 | 37.0 | 36.0 |
| | after 4 hours | 33.1 | 30.7 | 27.6 |
| 100$^{th}$ time | after 0 hour | 45.5 | 46.0 | 47.5 |
| | after 2 hours | 37.2 | 36.4 | 36.3 |
| | after 4 hours | 32.8 | 30.1 | 27.3 |

* All numerical values are indicative of temperature (° C.).

Examples 6-1 to 6-3, Comparative Example 6-1

Example 6-1

The starting materials shown in Table 6-1 were used, and a mixture of the heat-storage material 6-A, the surfactant and the organically treated layered clay mineral, the hydroxyl group-containing compound and the isocyanate group-containing compound in the compounding amounts shown in Table 6-2 were mixed at temperature of 40° C. under stirring at 1000 rpm with a stirring blade, to disperse the heat-storage material 6-A in colloidal state (average particle diameter 460 μm), then the reaction accelerator was added, and the mixture was sufficiently stirred. After stirring, the mixture was poured into a mold laid with a 12 μm polyethylene terephthalate film (PET film), further laminated with a PET film, cured at 50° C. for 60 minutes and removed from the mold to give heat-storage object 6-1 (80×120×2 mm). The NCO/OH ratio was 1.0

Using a polyester fabric as an outer material and a nylon fabric as a lining material, thermal clothes were prepared. Pockets were attached to right and left chest regions, abdominal region, dorsal region and lumbar region respectively such that the heat-storage object 6-1 could be held between the outer material and the lining material, and then the heat-storage object 6-1 was held therein.

Sensory Test 1

Figure 9:
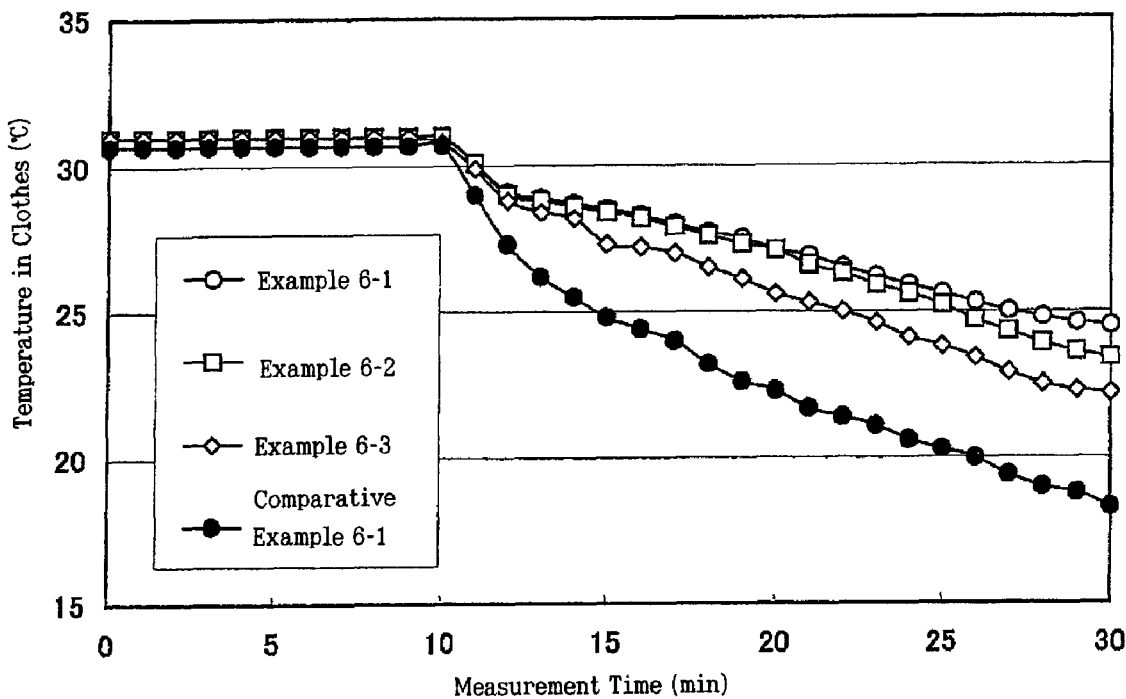
FIG. 9 is a graph showing temperature change in a sensory test 1 in Examples 6-1 to 6-3 and Comparative Example 6-1.

A person wore the above thermal clothes, then sat on a chair for 10 minutes in an atmosphere at 25° C., and sat in a chair for 20 minutes in an atmosphere at 5° C. At this time, a change in the left chest region on the surface of the lining material (change in temperature in the clothes) was measured. The results are shown in FIG. 9.

Sensory Test 2

Figure 10:
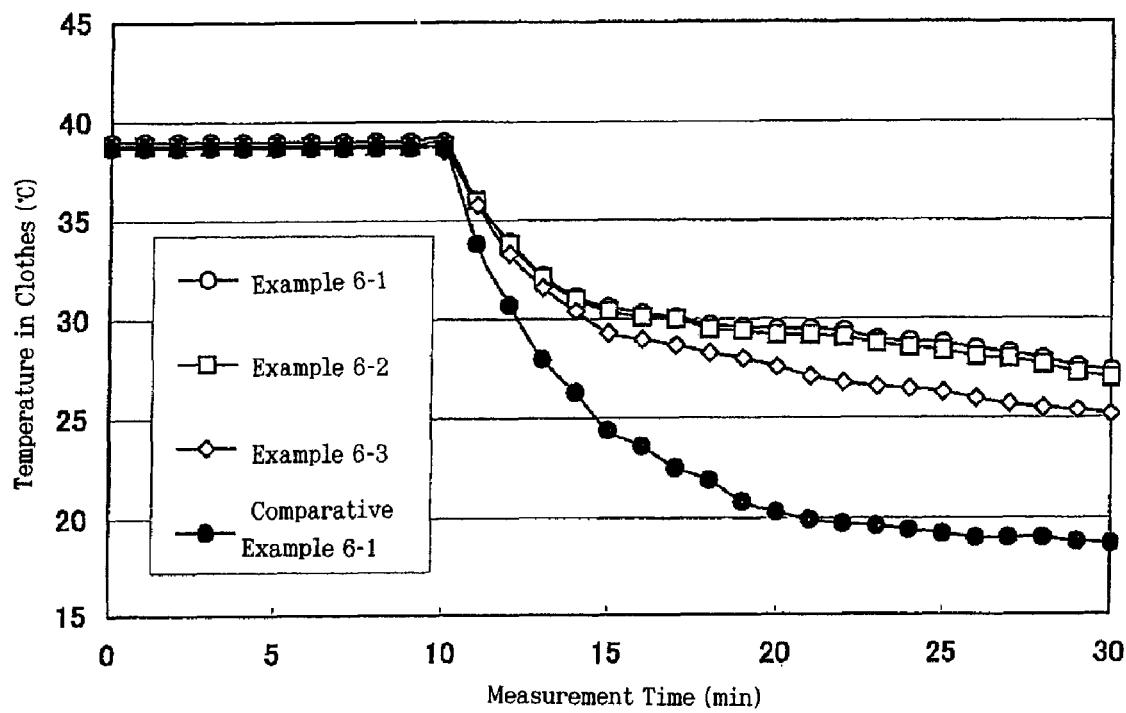
FIG. 10 is a graph showing temperature change in a sensory test 2 in Examples 6-1 to 6-3 and Comparative Example 6-1.

A person wore the above thermal clothes, then walked for 10 minutes in an atmosphere at 25° C., and sat in a chair for 20 minutes in an atmosphere at 5° C. At this time, a change in the left chest region on the surface of the lining material (change in temperature in the clothes) was measured. The results are shown in FIG. 10.

Example 6-2

The starting materials shown in Table 6-1 were used, and a mixture of the heat-storage material 6-A and the surfactant, the hydroxyl group-containing compound and the isocyanate group-containing compound in the compounding amounts shown in Table 6-2 were mixed at temperature of 40° C. under stirring at 2000 rpm with a stirring blade, to disperse the heat-storage material 6-A in colloidal state (average particle diameter 180 μm), then the reaction accelerator was added, and the mixture was sufficiently stirred. After stirring, the mixture was poured into a mold laid with a 12 μm polyethylene terephthalate film (PET film), further laminated with PET film, cured at 50° C. for 60 minutes and removed from the mold to give heat-storage object 6-2 (80×120×2 mm).

Using polyester fabric as outer material and nylon fabric as lining material, thermal clothes were prepared. Pocket were attached to right and left chest regions, abdominal region, dorsal region and lumbar region respectively such that the heat-storage object 6-2 could be held between the outer material and the lining material, and then the heat-storage object 6-2 was held therein. The resulting clothes were examined in the same sensory tests 1 and 2 as in Example 6-1. The results are shown in FIGS. 9 and 10.

Example 6-3

The starting materials shown in Table 6-1 were used, and a mixture of the heat-storage material 6-A, the surfactant and the organically treated layered clay mineral, the hydroxyl group-containing compound and the isocyanate group-containing compound in the compounding amounts shown in Table 6-2 were mixed at temperature of 40° C., to disperse the heat-storage material 6-A in colloidal state (average particle diameter 200 μm), then the reaction accelerator was added, and the mixture was sufficiently stirred. After stirring, the mixture was poured into a mold laid with 12 μm polyethylene terephthalate film (PET film), further laminated with PET film, cured at 50° C. for 60 minutes and removed from the mold to give heat-storage object 6-3 (80×120×2 mm).

Using polyester fabric as outer material and nylon fabric as lining material, thermal clothes were prepared. Pockets were attached to right and left chest regions, abdominal region, dorsal region and lumbar region respectively such that the heat-storage object 6-3 could be held between the outer material and the lining material, and then the heat-storage object 6-3 was held therein.

The resulting clothes were examined in the same sensory tests 1 and 2 as in Example 6-1. The results are shown in FIGS. 9 and 10.

Comparative Example 6-1

The sensory tests 1 and 2 were carried out in which the heat-storage object was not held in the thermal clothes used in Example 6-1.

The results are shown in FIGS. 9 and 10.

TABLE 6-1

| Heat-Storage Material 6-A | Methyl palmitate (phase change temperature, 30.0° C.; latent heat quantity 210 kJ/kg) |
| --- | --- |
| Surfactant | Polyoxyethylene sorbitan monopalmitate (HLB = 15.6) |
| Organically Treated Layered Clay Mineral | BENTONE 1000 (manufactured by Elementis Japan K.K.) |
| Hydroxyl Group-Containing Compound | Solventless polyester polyol: polymer of 2,4-diethyl-1,5-pentamethylene diol and adipic acid; hydroxyl value 60 mg KOH/g, molecular weight 2000 |
| Isocyanate Group-Containing Compound | HMDI-based polyisocyanate (isocyanurate type): NCO % 18.0% (solid content 100%) |
| Reaction Accelerator | Dibutyltin dilaurate |

TABLE 6-2

| | Heat-Storage Object 6-1 | Heat-Storage Object 6-2 | Heat-Storage Object 6-3 |
| --- | --- | --- | --- |
| Heat-Storage Material 6-A | 69.0 | 69.0 | 55.0 |
| Surfactant | 3.0 | 3.0 | 3.0 |
| Organically Treated Layered Clay Mineral | 8.0 | | 8.0 |
| Hydroxyl Group-Containing Compound | 16.0 | 16.0 | 26.5 |
| Isocyanate Group-Containing Compound | 4.0 | 4.0 | 7.4 |
| Reaction Accelerator | 0.1 | 0.1 | 0.1 |

* All numerical values are expressed in parts by weight.

INDUSTRIAL APPLICABILITY

The heat-storage object of the present invention is formed and processed mainly in the form of a sheet and used preferably as interior materials and exterior materials such as inner wall materials, outer wall materials, ceiling materials and floor materials of architectural structures such as housings and as interior materials of vehicles. The heat-storage object of the present invention can also be applied to a thermoelectric conversion system, a refrigerator/freezer, a cooler box, a heat retaining sheet, and structural materials for floor heating.

The invention claimed is:

1. A composition for heat-storage object formation, comprising an organic latent heat-storage material (a), a nonionic surfactant (b), and a compound (c-1) having a reactive functional group, wherein
    a hydrophile-lipophile balance (HLB) of the nonionic surfactant (b) is 12 or more, and
    the compound (c-1) having a reactive functional group is a polyol.

2. The composition for heat-storage object formation according to claim 1, further comprising an organically treated layered clay mineral (d).

3. The composition for heat-storage object formation according to claim 2, wherein the organically treated layered clay mineral (d) is in an amount of 0.5 to 50 parts by weight based on 100 parts by weight of the organic latent heat-storage material (a).

4. The composition for heat-storage object formation according to claim 1, wherein the nonionic surfactant (b) is polyoxyethylene sorbitan fatty acid ester.

5. A heat-storage object comprising an organic latent heat-storage material (a), a nonionic surfactant (b), and a binder (c), wherein
    the organic latent heat-storage material (a) is in the form of fine particles fixed with the binder (c),
    a hydrophile-lipophile balance (HLB) of the nonionic surfactant (b) is 12 or more,
    the binder (c) is a product formed by reaction of a compound (c-1) having a reactive functional group with a compound (c-2) having a second reactive functional group reactive with the reactive functional group,
    the compound (c-1) having the reactive functional group is a polyol, and
    the compound (c-2) having the second reactive functional group is an isocyanate group-containing compound.

6. The heat-storage object according to claim 5, further comprising an organically treated layered clay mineral (d).

7. The heat-storage object according to claim 6, wherein the amount of the layered clay mineral (d) added is 0.5 to 50 parts by weight based on 100 parts by weight of the organic latent heat-storage material (a).

8. The heat-storage object according to claim 6, wherein the organic latent heat-storage material (a) and the organically treated layered clay mineral (d) are in the form of fine particles fixed with the binder (c).

9. The heat-storage object according to claim 5, wherein the content of the organic latent heat-storage material (a) is 40 wt % or more.

10. The heat-storage object according to claim 5, wherein the binder (c) has a segment generating heat with microwaves.

11. The heat-storage object according to claim 5, which is a cured product.

12. A heat-storage structure comprising the heat-storage object of claim 5 covered with a surface material.

13. The heat-storage object according to claim 5, wherein the nonionic surfactant (b) is polyoxyethylene sorbitan fatty acid ester.

14. A heat-storage structure comprising the heat-storage object of claim 5 formed into a sheet, at least one side of which is laminated with a laminating material.

15. The heat-storage structure according to claim 14, further comprising a heating element laminated therein.

16. The heat-storage structure according to claim 15, further comprising a heat insulator laminated on the heating element.

17. The heat-storage structure according to claim 14, wherein the laminating material is a flame-retardant or non-flammable material.

18. The heat-storage structure according to claim 14, wherein the laminating material is a heat conductor.

19. The heat-storage structure according to claim 14, wherein the laminating material is a heat insulator having a heat conductivity of less than 0.1 W/(m·K).

20. A process for producing a heat-storage object, which comprises:

mixing a composition for heat-storage object formation containing an organic latent heat-storage material (a), a nonionic surfactant (b) and a compound (c-1) having reactive functional group, with a compound (c-2) having a second reactive functional group reactive with the reactive functional group, wherein a hydrophile-lipophile balance (HLB) of the nonionic surfactant (b) is 12 or more, the compound (c-1) having the reactive functional group is a polyol, and the compound (c-2) having the second reactive functional group is an isocyanate group-containing compound;

dispersing the organic latent heat-storage material (a) in a colloidal state; and reacting the component (c-1) with the component (c-2).

21. The process for producing a heat-storage object according to claim 20, wherein the content of the organic latent heat-storage material (a) is 40 wt % or more.

22. The process for producing a heat-storage object according to claim 20, wherein the composition further comprises an organically treated layered clay mineral (d).

23. The process for producing a heat-storage object according to claim 22, wherein the organically treated layered clay mineral (d) is in an amount of 0.5 to 50 parts by weight based on 100 parts by weight of the organic latent heat-storage material (a).

24. The process for producing a heat-storage object according to claim 20 wherein the nonionic surfactant (b) is polyoxyethylene sorbitan fatty acid ester.

* * * * *